United States Patent
Saito et al.

(10) Patent No.: US 8,656,099 B2
(45) Date of Patent: Feb. 18, 2014

(54) STORAGE APPARATUS AND STORAGE CONTROL METHOD FOR THE SAME

(75) Inventors: Kenichi Saito, Tokyo (JP); Takashi Chikusa, Odawara (JP); Kazuya Hirano, Odawara (JP); Hiroyuki Kumasawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 831 days.

(21) Appl. No.: 12/865,414

(22) PCT Filed: Jul. 22, 2010

(86) PCT No.: PCT/JP2010/004705
§ 371 (c)(1),
(2), (4) Date: Jul. 30, 2010

(87) PCT Pub. No.: WO2012/011153
PCT Pub. Date: Jan. 26, 2012

(65) Prior Publication Data
US 2012/0023292 A1    Jan. 26, 2012

(51) Int. Cl.
*G06F 12/00* (2006.01)
(52) U.S. Cl.
USPC ..... 711/114; 711/202; 711/203; 711/E12.008
(58) Field of Classification Search
USPC .......... 711/103, 114, 170, E12.008, 202, 203
See application file for complete search history.

(56) References Cited

U.S. PATENT DOCUMENTS

| | | | |
|---|---|---|---|
| 8,171,324 B2 * | 5/2012 | Ushijima | 713/324 |
| 2009/0228653 A1 | 9/2009 | Yamagami | |
| 2009/0231750 A1 | 9/2009 | Hakamata | |
| 2009/0248980 A1 | 10/2009 | Hashimoto | |
| 2010/0005261 A1 | 1/2010 | Shiga et al. | |
| 2010/0023685 A1 | 1/2010 | Ikejiri et al. | |
| 2010/0070706 A1 | 3/2010 | Inomata | |

FOREIGN PATENT DOCUMENTS

| | | |
|---|---|---|
| JP | 4-325817 | 11/1992 |
| JP | 2005-234820 | 9/2005 |
| JP | 2007-156667 | 6/2007 |

* cited by examiner

*Primary Examiner* — Pierre-Michel Bataille
(74) *Attorney, Agent, or Firm* — Brundidge & Stanger, P.C.

(57) ABSTRACT

A storage apparatus and its control method capable of implementing thin provisioning and reducing power consumption of storage devices are provided. The storage apparatus classifies a plurality of storage devices, which provide a pool with a storage resource, into a plurality of groups; performs thin provisioning operation by setting some of the plurality of groups to an active mode, in which the storage devices belonging to the groups are made to enter an activated state; sets other groups to a power-saving mode in which the storage devices are made to enter a power-saving state; and sequentially switches between the group(s) in the active mode and the group(s) in the power-saving mode among the plurality of groups.

11 Claims, 35 Drawing Sheets

| POOL ID | POOL ATTRIBUTE | TIER SEGMENT | SPG(S) BELONGING TO POOL | MAID ATTRIBUTE | OBJECT SPG(S) | NUMBER OF ACTIVE SPG(S) | ACTIVE SPG(S) | ACTIVATION CANDIDATE SPG(S) | POWER -SAVING POLICY |
|---|---|---|---|---|---|---|---|---|---|
| POOL 1 | R/W | Tier-0 | P1-1 | COMPLETELY INHIBITED | - | - | - | - | - |
| POOL 2 | R/W | Tier-1 | P2-1 TO P2-5 | PARTIALLY PERMITTED | P2-3 TO P2-5 | 1 | P2-3 | P2-4 | PMT-1 → FIG. 10 |
| POOL 3 | R/W | Tier-2 | P3-1 TO P3-8 | COMPLETELY PERMITTED | P3-1 TO P3-8 | 2 | P3-1,2 | P3-3,4 | PMT-2 |
| POOL 4 | WORM | Tier-3 | P4-1 TO P4-16 | COMPLETELY PERMITTED | P4-1 TO P4-16 | 1 | P4-1 | P4-2 | PMT-3 |

| | DRIVE | I/F | TRANSFER SPEED | I/O PRIORITY (1) | I/O PRIORITY (2) | CACHE OCCUPANCY | MIGRATION THRESHOLD |
|---|---|---|---|---|---|---|---|
| Tier-0 | SSD | SAS | 6Gbps | HIGHEST | 70% | 10%,+10%/-5% | 10 TIMES/DAY |
| Tier-1 | HDD | SAS | 6Gbps | HIGH | 15% | 60%,±5% | 5 TIMES/DAY |
| Tier-2 | HDD | SATA | 6Gbps | MEDIUM | 10% | 25%,-5% | ONCE PER DAY |
| Tier-3 | HDD | SAS/SATA | 3Gbps | LOW | 5% | 5%,+5% | LESS THAN ONCE PER WEEK |
| Tier-4 | TAPE | SAS | 6Gbps | — | — | — | LESS THAN ONCE PER MONTH |

| | SPG ID | RAID Gr.# | SPG CAPACITY | STATUS | ALLOCATED CAPACITY | INCREASED ALLOCATED CAPACITY | ELAPSED TIME |
|---|---|---|---|---|---|---|---|
| POOL 1 | P1-1 | 1,2,3,4 | 5TB | ACTIVE | 50GB | nnGB | xxxx:xx:xx |
| POOL 2 | P2-1 | 5,6,7,8 | 50TB | ACTIVE | 750GB | nnGB | xxxx:xx:xx |
| | P2-2 | 9,10,11,12 | 50TB | ACTIVE | 750GB | nnGB | xxxx:xx:xx |
| | P2-3 | 13 TO 20 | 100TB | ACTIVE | 202GB | 1.9GB | 0000:14:07 |
| | P2-4 | 21 TO 28 | 100TB | BEING DIAGNOSED | 200GB | 0 | 0000:00:00 |
| | P2-5 | 29 TO 36 | 100TB | IDLE-1 | 200GB | 0 | 0000:00:00 |
| POOL 3 | P3-1 | 37 TO 40 | 50TB | ACTIVE | 255GB | 5.0GB | 0004:08:00 |
| | P3-2 | 41 TO 44 | 50TB | ACTIVE | 255GB | 5.0GB | 0004:08:00 |
| | P3-3 | 45 TO 48 | 50TB | IDLE-2 | 250GB | 0 | 0000:00:00 |
| | P3-4 | 49 TO 52 | 50TB | IDLE-2 | 250GB | 0 | 0000:00:00 |
| | P3-5 | 53 TO 56 | 50TB | STANDBY | 250GB | 0 | 0000:00:00 |
| | P3-6 | 57 TO 60 | 50TB | STANDBY | 250GB | 0 | 0000:00:00 |
| | P3-7 | 61 TO 64 | 50TB | STANDBY | 250GB | 0 | 0000:00:00 |
| | P3-8 | 65 TO 68 | 50TB | STANDBY | 250GB | 0 | 0000:00:00 |
| POOL 4 | P4-1 | 101 TO 104 | 100TB | ACTIVE | 559GB | 9.3GB | 0011:58:00 |
| | P4-2 | 105 TO 108 | 100TB | BEING ACTIVATED | 550GB | 0 | 0000:00:00 |
| | P4-3 | 109 TO 112 | 100TB | SLEEP | 550GB | 0 | 0000:00:00 |
| | ... | | | ... | | ... | |
| | P4-15 | 157 TO 160 | 100TB | SLEEP | 550GB | 0 | 0000:00:00 |
| | P4-16 | 161 TO 164 | 100TB | SLEEP | 550GB | 0 | 0000:00:00 |

| POLICY ID | TRANSITION CONDITION | THRESHOLD | POWER-SAVING MODE TO WHICH TRANSITION CAN BE MADE | ACTIVATION CANDIDATE STATE | HIGH-FREQUENCY ACCESS DATA MIGRATION | |
|---|---|---|---|---|---|---|
| | | | | | ACCESS FREQUENCY | MIGRATION DESTINATION |
| PMT-1 | CAPACITY | 2.0GB | IDLE-1 | – | 5 TIMES | NON-OBJECT SPG |
| PMT-2 | CAPACITY | 20.0GB | STANDBY | IDLE-2 | 3 TIMES | ACTIVE SPG |
| PMT-3 | TIME | 12.0hr | SLEEP | – | – | – |

| VIRTUAL VOL | LBA | BLOCK LENGTH | POOL ID | PAGE NUMBER | ENTRY | NUMBER OF CONSUMED ENTRIES | NEW ALLOCATION TIME | LAST UPDATE TIME | ACCUMULATED ACCESS COUNT |
|---|---|---|---|---|---|---|---|---|---|
| VVOL1 | 00000000h | 040h | POOL 2 | 00000000h | P0001 | 1 | aaaa:aa:aa | aaaa:aa:aa | 1 |
| VVOL1 | 00040000h | 300h | POOL 2 | 00000001h | P0002 | 3 | bbbb:bb:bb | xxxx:xx:xx | 10 |
| VVOL2 | 00000000h | 100h | POOL 2 | 00000004h | P0003 | 1 | cccc:cc:cc | yyyy:yy:yy | 2 |

| ENTRY | RAID Gr.# | Drive # | PHYSICAL LBA | OFFSET | BLOCK LENGTH | UNUSED AREA |
|---|---|---|---|---|---|---|
| P0001 | 13(P2-3) | R13-1 | 00000000h | 0 | 040h | 0C0h |
| P0002 | 13(P2-3) | R13-2 | 00000000h | 0 | 100h | 0 |
| | 13(P2-3) | R13-3 | 00000000h | 0 | 100h | 0 |
| | 13(P2-3) | R13-4 | 00000000h | 0 | 100h | 0 |
| P0003 | 13(P2-3) | R13-1 | 00000100h | 0 | 100h | 0 |

| ENTRY | RAID Gr.# | Drive # | PHYSICAL LBA | OFFSET | BLOCK LENGTH | UNUSED AREA |
|---|---|---|---|---|---|---|
| P0001 | 13(P2-3) | R13-1 | 00000000h | 0 | 040h | 0C0h |
| P0002 | 5(P2-1) | R5-1 | 00080000h | 0 | 100h | 0 |
|  | 5(P2-1) | R5-2 | 00080000h | 0 | 100h | 0 |
|  | 5(P2-1) | R5-3 | 00080000h | 0 | 100h | 0 |
| P0003 | 13(P2-3) | R13-1 | 00000100h | 0 | 100h | 0 |

| ENTRY | RAID Gr.# | Drive # | PHYSICAL LBA | OFFSET | BLOCK LENGTH | UNUSED AREA |
|---|---|---|---|---|---|---|
| P0001 | 13(P2-3) | R13-1 | 00000000h | 0 | 040h | 0C0h |
| P0002 | 21(P2-4) | R21-1 | 00040000h | 0 | 100h | 0 |
| | 21(P2-4) | R21-2 | 00040000h | 0 | 100h | 0 |
| | 21(P2-4) | R21-3 | 00040000h | 0 | 100h | 0 |
| P0003 | 13(P2-3) | R13-1 | 00000100h | 0 | 100h | 0 |

| RAID Gr.# | Drive # | PHYSICAL LBA | OFFSET | BLOCK LENGTH | UNUSED AREA |
|---|---|---|---|---|---|
| 13(P2-3) | R13-2 | 00000000h | 0 | 100h | 100h |
| 13(P2-3) | R13-3 | 00000000h | 0 | 100h | 100h |
| 13(P2-3) | R13-4 | 00000000h | 0 | 100h | 100h |

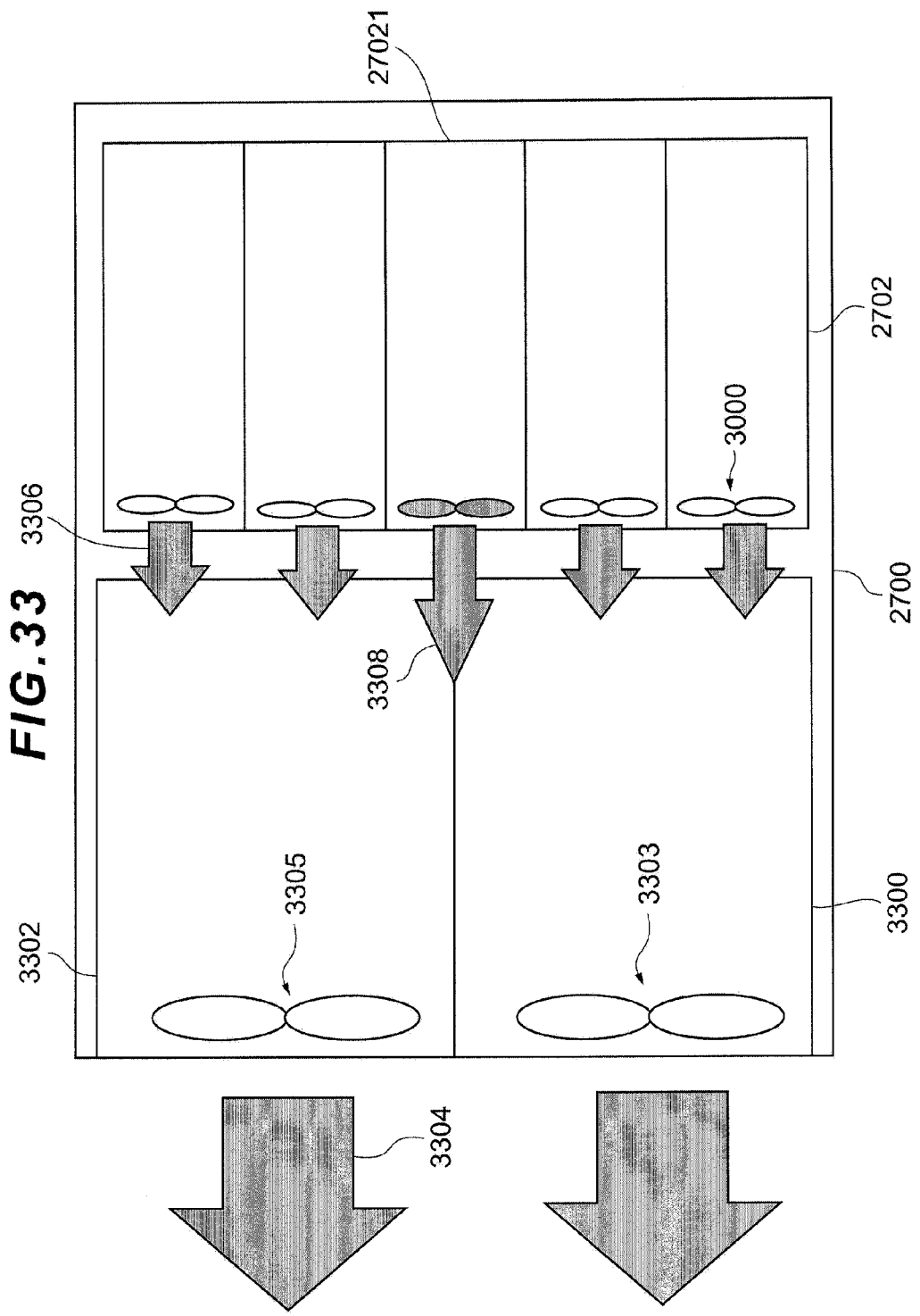

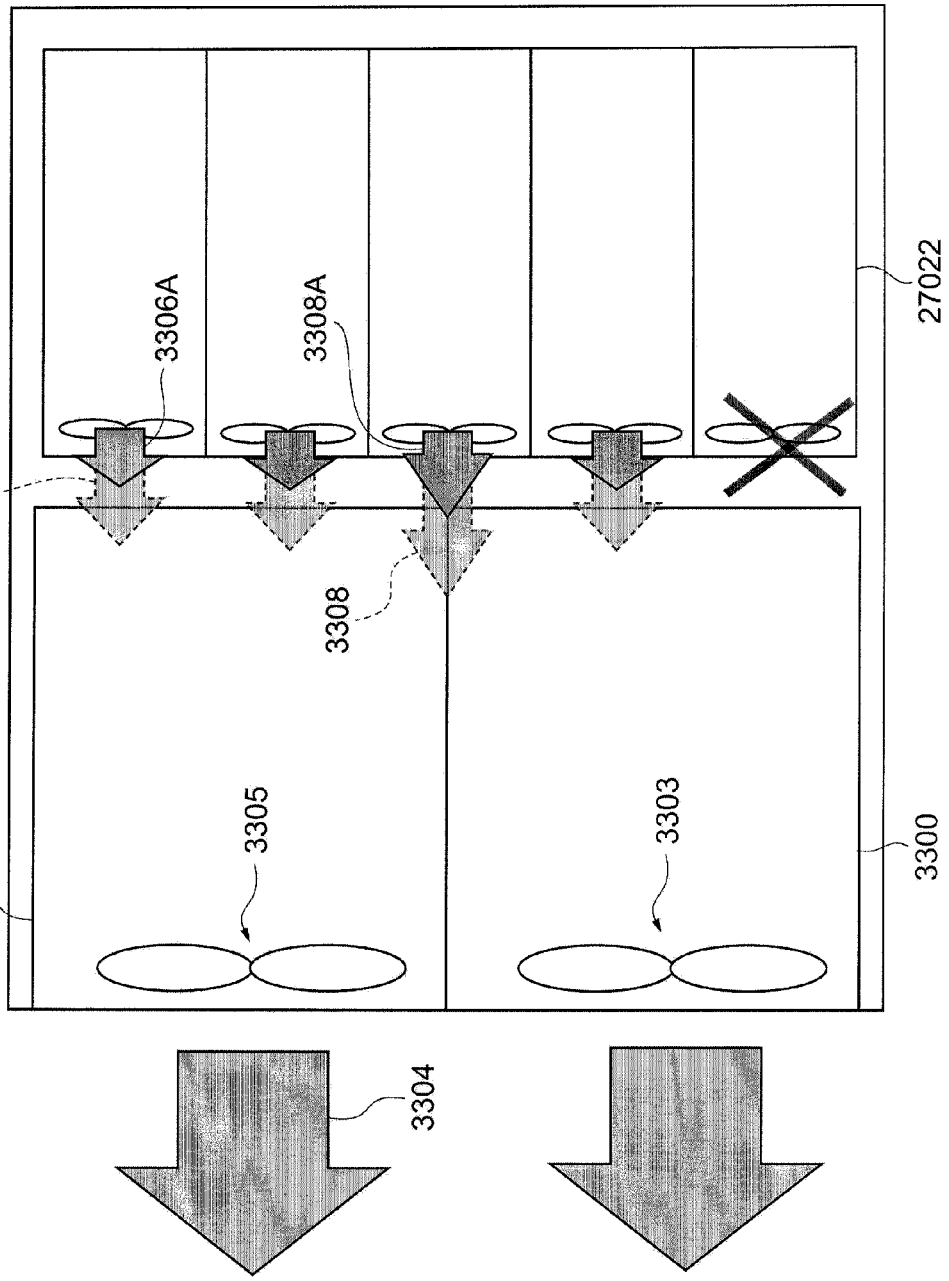

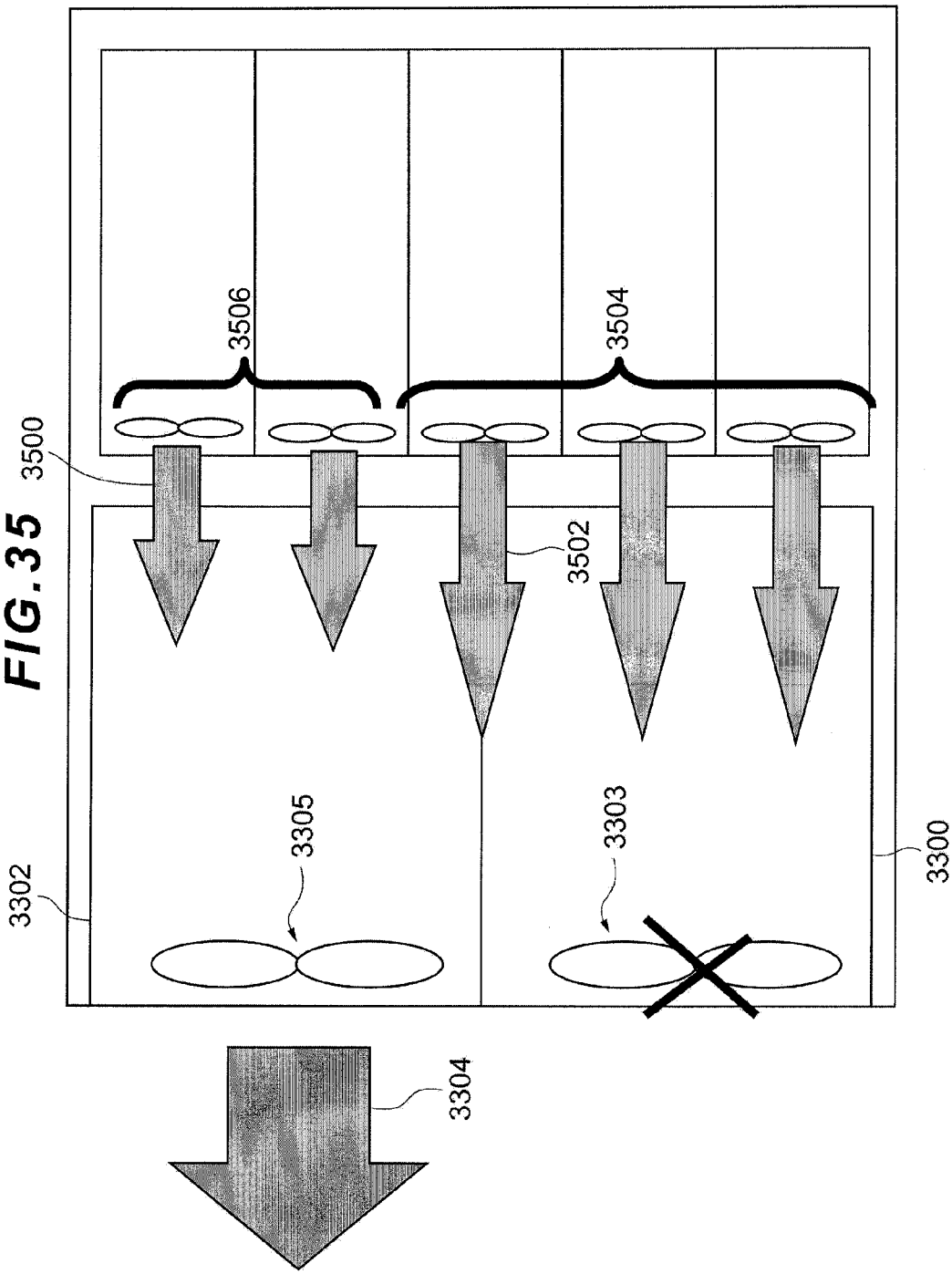

STORAGE APPARATUS AND STORAGE CONTROL METHOD FOR THE SAME

TECHNICAL FIELD

This U.S. non-provisional patent application claims priority under 35 U.S.C. §119 of PCT/JP2010/004705, filed on Jul. 22, 2010 in the Japanese Patent Office, the entire contents of which is herby incorporated by reference.

The present invention relates to a storage apparatus. Particularly, the invention relates to a storage apparatus used for thin provisioning and power-saving management.

BACKGROUND ART

A computer system for providing a large-scale data storage service to a host computer has been used. This computer system is also called a storage system and is known to include a storage apparatus for executing data write and/or read processing on storage devices under its control in response to a command from the host computer, and a management apparatus for managing the storage apparatus.

The storage apparatus is equipped with a plurality of hard disk drives (HDDs) and manages them as storage devices according to a RAID (Redundant Array of Independent/Inexpensive Disks) system. Physical storage areas belonging to a plurality of HDDs are provided as logical volumes to the host computer. The host computer sends a data read/write request to the logical volumes.

In recent years, the storage capacity of storage apparatuses has been increasing steadily due to changes in the social environment such as an increase in the amount of information. On the other hand, power-saving techniques for electronic devices have been considered to be very important in order to minimize the influence on the environment as represented by prevention of global warming. There are two representative means of power-saving techniques for storage apparatuses as follows: prevention of mounting of excessive amount of storage devices (HDDs) by efficient operation of the storage capacity; and reduction of power consumption by stopping unnecessary storage devices.

An example of the former means is a storage management technique called Thin Provisioning (for example, Japanese Patent Application Laid-Open (Kokai) Publication No. 2005-234820), and an example of the latter means is a storage management technique called MAID (Massive Array of Inactive Disks) (for example, Japanese Patent Application Laid-Open (Kokai) Publication No. 2007-156667 and Japanese Patent No. 4325817).

The above-mentioned thin provisioning is one of storage virtualization techniques and is characterized in that the capacity efficiency of a storage apparatus is enhanced by forming a pool with the capacity of storage resources and allocating virtual volumes to a host computer, thereby reducing the initial capacity required in a case of logical volumes. As a result, power consumption can be reduced by reducing the HDDs which should be mounted in the storage apparatus.

In actual operation of the thin provisioning, a storage apparatus forms a plurality of RAID groups from a plurality of storage devices and the RAID groups are gathered to form a storage pool; and the storage capacity is allocated from the pool in response to access from the host computer to virtual volumes. When doing so, the storage apparatus allocates a storage area equally to the virtual volumes from the plurality of RAID groups that form the pool.

On the other hand, the above-mentioned MAID is characterized in that it achieves power-saving by making storage devices, which are not accessed by the host computer and are in a standby state, make the transition to a power-saving state by stopping motors for the storage devices, or limiting power supply to the storage devices.

CITATION LIST

Patent Literature

PTL 1: Japanese Patent Application Laid-Open (Kokai) Publication No. 2005-234820

PTL 2: Japanese Patent Application Laid-Open (Kokai) Publication No. 2007-156667

PTL 3: Japanese Patent No. 4325817

SUMMARY OF INVENTION

Technical Problem

Both of the above-mentioned two techniques have been adopted exclusively for devices, while advocating the power-saving effect. That is mainly because the thin provisioning normally distributes accesses from a host computer equally to a plurality of RAID groups in a storage pool which provides virtual volumes, so that the power supply status of devices belonging to all the RAID groups has to be in an active mode.

However, power-saving cannot be achieved under the circumstances described above. So, there is an innovative idea like Japanese Patent Application Laid-Open (Kokai) Publication No. 2007-156667 of sequentially activating a plurality of RAID groups by using one RAID group in a pool for thin provisioning and keeping other RAID groups in the same pool in a power-saving mode until the storage capacity of that RAID group is fully used up.

However, the above-described method has problems of not only a decrease in the access distribution effect in the thin provisioning, but also an accumulative increase of power consumption caused by an increase of the used capacity of the pool.

Therefore, it is an object of this invention to provide a storage apparatus and its control method capable of reducing power consumption by storage devices by adopting the MAID system and achieving the synergetic effect with the low power consumption effect and efficient operation of the storage capacity without damaging the advantages of the thin provisioning.

Solution to Problem

In order to achieve the above-described object, a storage apparatus according to this invention is characterized in that a RAID group, which is constituted from a plurality of storage devices for providing a storage pool with storage resources, is further classified into a plurality of groups (sub-pool groups); some of the plurality of groups is set to an active mode in which the storage devices belonging to the groups are made to enter an activated state; other groups are set to a power-saving mode in which the storage devices are made to enter a power-saving state; and the group(s) in the active mode and the group(s) in the power-saving mode are sequentially switched among the plurality of groups; and while the group(s) are in the active mode, a storage area is allocated from storage resources of these groups in response to write access by a host computer.

Advantageous Effects of Invention

The present invention can provide a storage apparatus and its control method for reducing power consumption of storage devices and implementing thin provisioning.

BRIEF DESCRIPTION OF DRAWINGS

FIG. 9 shows an example of a pool attribute setting table (3508).

FIG. 12 shows an example of a tier attribute definition table (3510).

FIG. 13 shows an example of a sub-pool group definition table (3512).

FIG. 14 shows an example of a power-saving policy definition table (3514).

FIG. 15 is a second example of a virtual volume—address conversion table (362).

FIG. 16 is an example of a pool-storage-area allocation management table (3516).

FIG. 17 is a first update example for the pool-storage-area allocation management table shown in FIG. 16.

FIG. 18 is a second update example for the pool-storage-area allocation management table shown in FIG. 16.

FIG. 19 is a preferential-use-area management table for each pool (3518).

FIG. 33 is a plan view of main parts relating to a first example (normal state) of fan control in the arrangement configuration of power source units and HDD mounting units.

FIG. 34 is a plan view of main parts relating to a second example (when a failure occurs in a fan for the HDD mounting unit) of fan control in the arrangement configuration of the power source units and the HDD mounting units.

FIG. 35 is a plan view of main parts relating to a third example (when a failure occurs in a fan for the power source unit) of fan control in the arrangement configuration of the power source units and the HDD mounting units.

DESCRIPTION OF EMBODIMENTS

Figure 1:
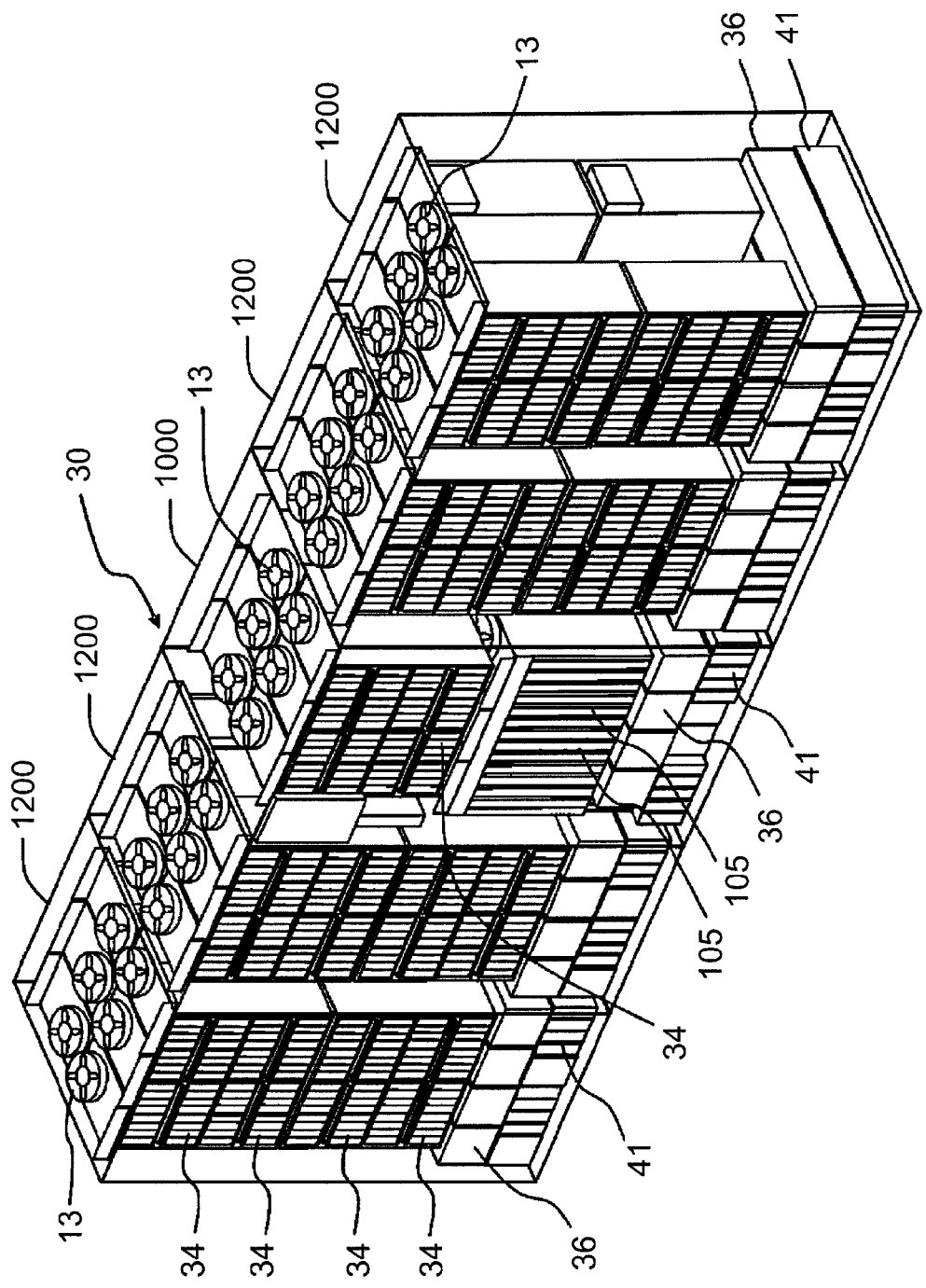
FIG. 1 is a perspective view of a storage apparatus (30).

Next, embodiments of this invention will be explained. FIG. 1 is a perspective view of a storage apparatus 30. The storage apparatus 30 includes a basic chassis 1000 and a plurality of additional chassis 1200.

The storage apparatus 30 is also called a storage subsystem. The basic chassis 1000 is a minimum constituent unit of the storage apparatus 30 and is equipped with a plurality of storage devices 34, a plurality of control packages 105, a plurality of power source units 36, and a plurality of battery units 41 in such a manner that they can be attached to, or removed from, the basic chassis 1000.

The basic chassis 1000 is also equipped with a plurality of cooling fans 13. The storage devices 34 should preferably be HDDs, but may be semiconductor memories such as SSDs or optical recording media.

The additional chassis 1200 is an option to the storage apparatus 30 and, for example, a maximum of four additional chassis 12000 can be connected to one basic chassis 1000.

Each additional chassis 1200 is equipped with a plurality of cooling fans 13. Each additional chassis 1200 is also equipped with a plurality of storage devices 34, a plurality of power source units 36, and a plurality of battery units 41 in such a manner that they can be attached to, or removed from, the additional chassis 1200. Each of those components is controlled by a control function of the control package 105 provided in each basic chassis 1000.

Figure 2:
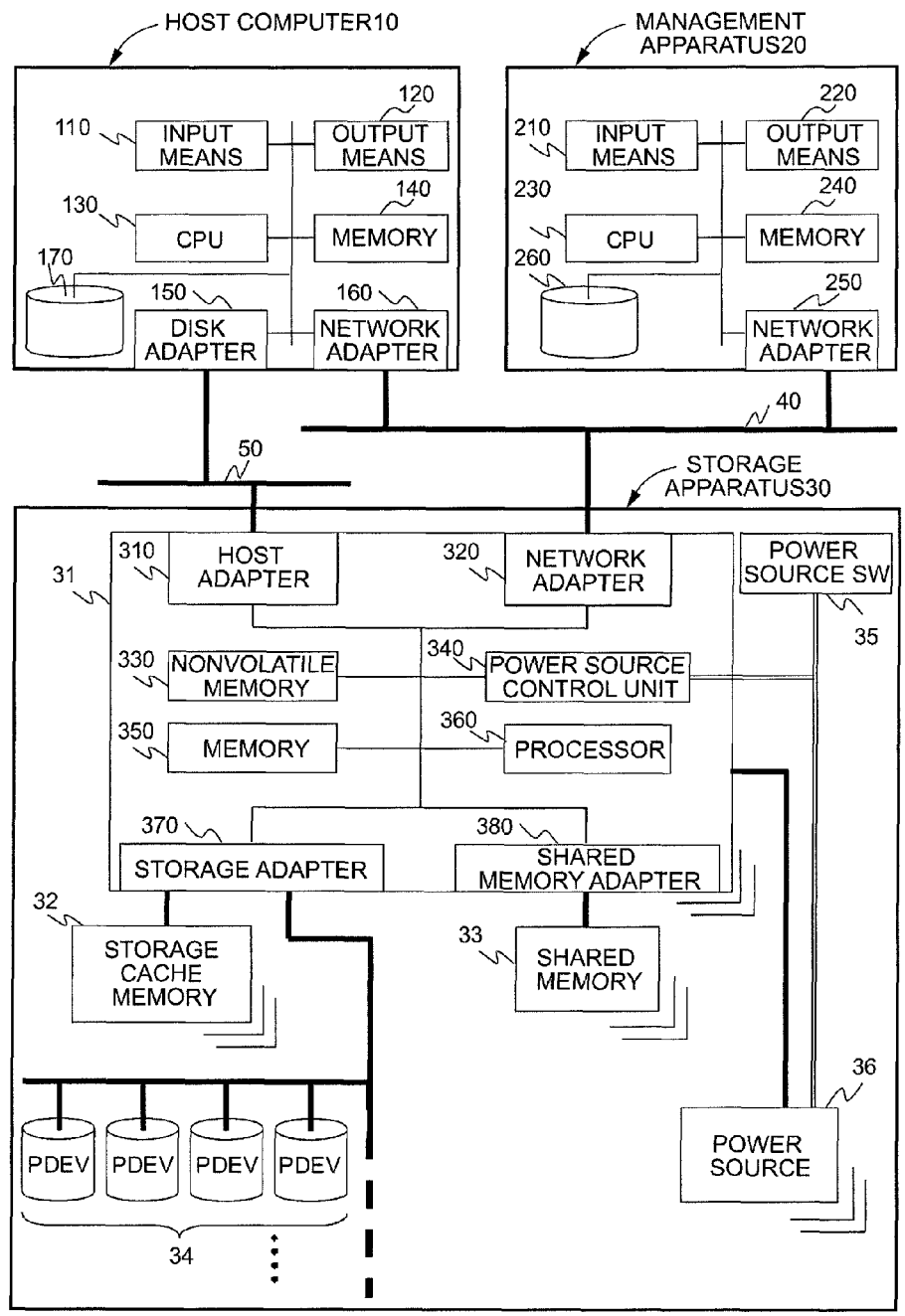
FIG. 2 is a hardware block configuration diagram of a storage apparatus (30).

Next, the hardware block configuration of the storage system will be explained with reference to FIG. 2. The storage system includes a host computer 10, a management apparatus 20, and the above-described storage apparatus 30 connected to the host computer 10 and the management apparatus 20.

The host computer 10 accesses logical storage resources of the storage apparatus 30. The management apparatus 20 manages the configuration of storage areas in the storage apparatus 30.

The storage apparatus 30 stores data in storage areas which are set to each storage device 34. The storage areas are set to a RAID group which is constituted from a plurality of storage devices; and a plurality of RAID groups constitute a storage pool 60.

The host computer 10 includes an input means 110, an output means 120, a CPU 130, a memory 140, a disk adapter 150, a network adapter 160, and a disk drive 170.

The input means 110 is a means of accepting input from an administrator, etc. who operates the host computer 10. The input means 110 is composed of, for example, a keyboard.

The output means 120 is a means of displaying the status and setting items of the host computer 10. The output means 120 is composed of, for example, a display device.

The CPU 130 reads programs, which are stored in the disk drive 170, to the memory 140 and executes processing defined by the programs. The memory 140 is composed of, for example, a RAM and stores programs, data, and so on.

The disk adapter 150 is connected to the storage apparatus 30 via a storage area network 50 and sends data to, or receives data from, the storage apparatus 30.

The storage area network 50 implements data transfer according to protocol (such as Fibre Channel) appropriate for data transfer.

The network adapter 160 sends data to, or receives data from, the management apparatus 20 or the storage apparatus 30 via the management network 40.

The management network 40 is composed of, for example, Ethernet (trademark). The disk drive 170 is composed of, for example, an HDD and stores data and programs.

The management apparatus 20 includes an input means 210, an output means 220, a CPU 230, a memory 240, a network adapter 250, and a disk drive 260.

The input means 210 is a means of accepting input from an administrator, etc. who operates the management apparatus 20. The input means 210 is composed of, for example, a keyboard.

The output means 220 is a means of displaying the status and setting items of the management apparatus 20. The output means 220 is composed of, for example, a display device.

The CPU 230 reads management programs, which are stored in the disk drive 260, to the memory 240 and executes management processing on the storage apparatus 30 according to the programs. The memory 240 is composed of, for example, a RAM and stores programs, data, and so on.

The network adapter 250 sends data to, or receives data from, the host computer 10 or the storage apparatus 30 via the management network 40.

The disk drive 260 is composed of, for example, an HDD and stores data and programs.

The storage apparatus 30 includes a controller 31, a storage cache memory 32, a shared memory 33, storage devices (PDEVs) 34, a power source switch 35, and a power source unit 36.

The controller 31 controls, for example, reading data from, or writing data to, storage areas formed in the PDEVs 34.

The storage cache memory 32 temporarily stores data which is read from, or written to, the PDEVs 34.

The shared memory 33 stores configuration information about the controller 31 and the PDEVs 34.

The power source unit 36 supplies electric power to each component of the storage apparatus 30.

The power source switch 35 is a switch for turning on/off power supply from the power source unit 36. The PDEVs 34 are, for example, HDDs and store user data.

The controller 31 includes at least a processor 360. In this embodiment, the controller 31 further includes a host adapter 310, a network adapter 320, a nonvolatile memory 330, a power source control unit 340, a memory 350, a storage adapter 370, and a shared memory adapter 380.

The controller 31 executes processing for a MAID function on the PDEVs 34 via the storage adapter 370 under the control of the processor 360.

The host adapter 310 sends data to, or receives data from, the host computer 10 via the storage network 50.

The network adapter 320 sends data to, or receives data from, the host computer 10 or the management apparatus 20 via the management network 40.

The nonvolatile memory 330 is composed of, for example, a hard disk or a flash memory and stores programs, configuration information, etc. that operate on the controller 31.

The power source control unit 340 controls electric power supplied from the power source unit 36.

The memory 350 is composed of, for example, a RAM and stores programs, data, etc. The processor 360 reads data such as programs and tables, which are stored in the nonvolatile memory 330, to the memory 350 and executes processing defined by the programs.

The storage adapter 370 sends or receives data between the PDEVs 34 and the storage cache memory 32.

The shared memory adapter 380 sends data to, or receives data from, the shared memory 33.

Figure 3:
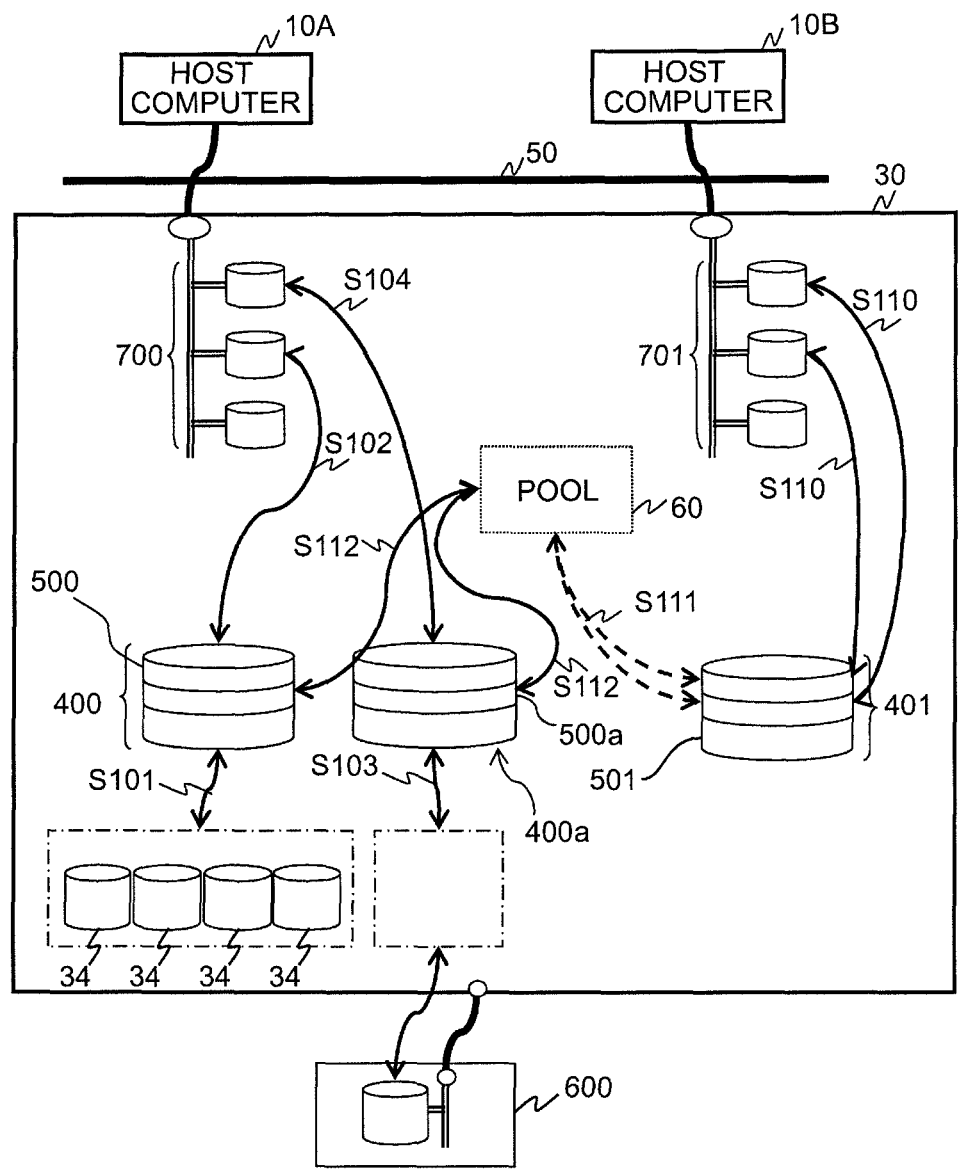
FIG. 3 is a block diagram of a function that shows an operation to dynamically allocate storage areas.

FIG. 3 is a block diagram illustrating a function showing an operation of the storage apparatus 30 to dynamically allocate storage areas (thin provisioning). A plurality of PDEVs 34 constitutes a RAID group according to the RAID configuration and a storage pool 60.

This RAID group constitutes a sub-pool group (SPG) 400 (S101). Real data stored in a plurality of virtual logical devices (virtual LDEVs) are allocated to, and stored in, storage areas 500 in storage areas of the SPG 400. For example, if data allocated to the storage area 500 is deleted, that storage area is released and returned as unused capacity to the storage pool 60.

The storage capacity (used storage capacity) of data stored in each SPG is considered to be, and managed as, the used storage capacity of the storage pool 60.

The host computer 10A accesses the host access logical unit (virtual LDEV) 700 in the storage apparatus 30. When the host computer 10 accesses the virtual LDEV 700, data is transferred via the SPG (S102) to a specific PDEV 34 according to the RAID system (S101).

The storage apparatus 30 can treat an externally connected physical device 600 in the same manner as with the PDEVs 34. Specifically speaking, a plurality of external SPGs 400*a* can be constituted from a plurality of external physical devices (EDEVs) 600 according to the RAID configuration (S103).

The external SPG 400*a* can be treated in the same manner as the SPG 400 composed of storage areas contained in the storage apparatus 30 and data is transferred via the external SPG 400*a* in accordance with an access request from the host computer 10 (S104).

The storage apparatus 30 may be designed so that an SPG 401 for snapshots can be set. For example, before the allocated storage area 500 or 500*a* in the SPG 400 or 400*a* is overwritten with update data from the host computer 10, the relevant data is read (S112) and migrated to the SPG 401 constituted from PDEVs 34 whose attribute is different (for example, SATA) from that of the above SPG 400 or 400*a* (S111). The storage apparatus 30 provides the host computer 10B with the (plurality of) virtual LDEVs 701 from the data in the SPG 401 and the SPG 400, 400*a* (S110).

It is possible to create a plurality of virtual LDEVs which share the same data and storage areas. If the virtual LDEVs are provided for read-only usage to the host computer 10B, it is unnecessary to allocate a new real storage area.

However, it is necessary to associate the pool 60 having real storage areas including the SPG 401 with the virtual LDEV 701 so that the host computer 10B can update them.

One or more pools 60 can be created and each pool 60 is constituted from groups of SPGs composed of one or more RAID groups with different attributes.

Write data from the host computers 10A, 10B is stored in the storage areas 500 provided by the storage pool 60. The storage areas 500 and the LBAs of the virtual LDEVs are associated with each other based on addresses. The write data from the host computers 10A or 10B is finally stored in the PDEVs 34.

Figure 4:
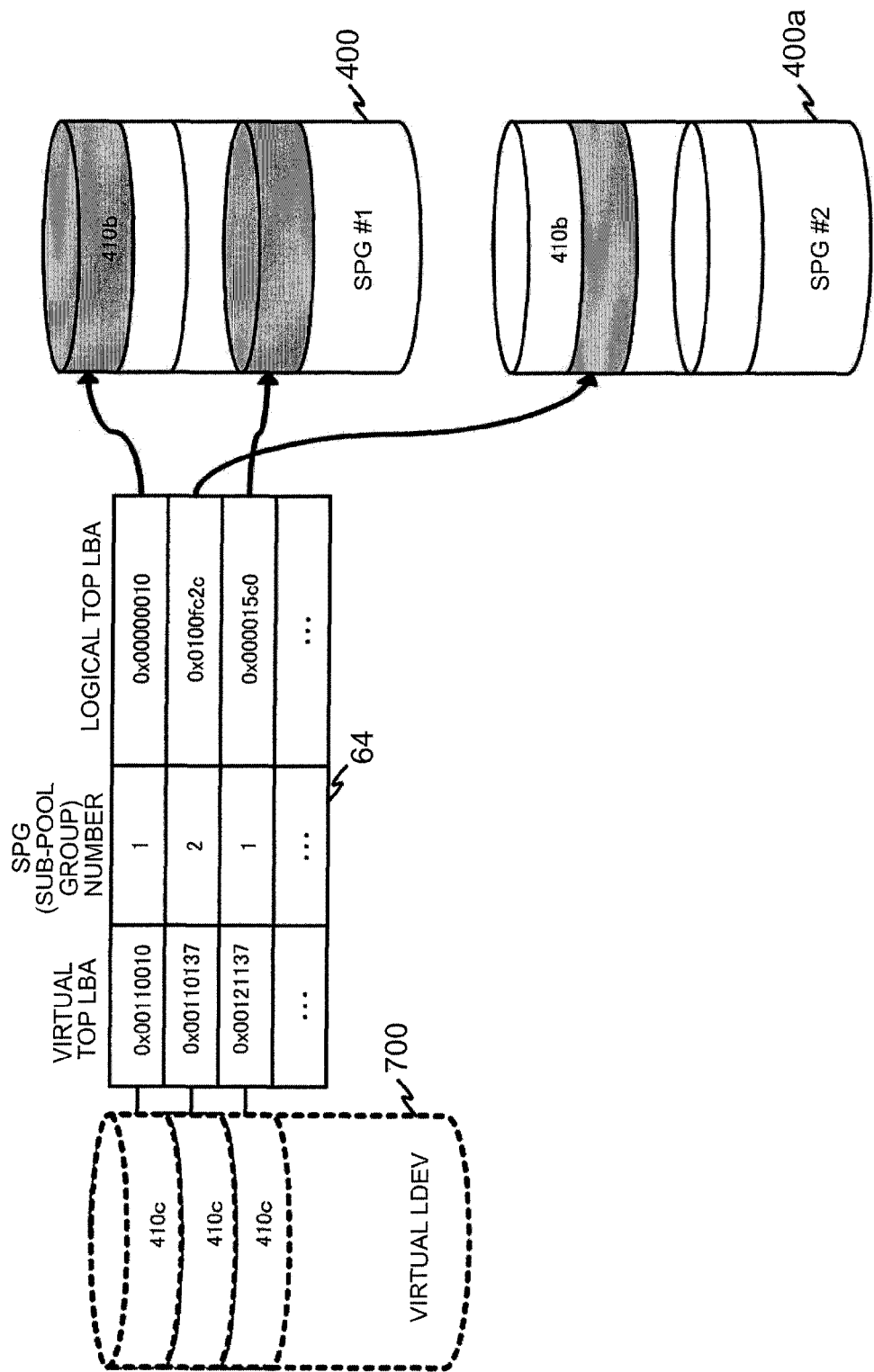
FIG. 4 is a block diagram showing the mapping relationship between virtual volumes and storage areas storing data.

FIG. 4 is a block diagram showing the mutual relationship between the virtual LDEV 700, the SPGs 400, 400a, and a virtual volume—mapping table 64 for managing allocation of the storage areas in the LDEV pool to the storage areas in the virtual LDEV.

The virtual LDEV 700 is composed of, for example, a plurality of virtual chunks 410c, 410c, and so on, each of which is of a certain size (for example, 64 KB (Kilo Bytes)). Each virtual chunk 410c is constituted from a specified number (for example, 128 pieces) of logical blocks (for example, one block in size of 512 bytes). One logical block corresponds to a virtual page.

A top logical block address (virtual top LBA) exists in each virtual chunk 410c. The storage apparatus 30 can specify the relevant virtual chunk 410c based on the virtual top LBA.

Each SPG is a set of one or more RAID groups and is composed of, for example, a plurality of logical chunks 410b, 410b, and so on of a certain size (for example, 64 KB). Each virtual chunk 410b is constituted from a specified number (for example, 128 pieces) of logical blocks (for example, one block in size of 512 bytes). One logical block corresponds to a logical page.

A top logical block address (logical top LBA) exists in each logical chunk 410b. The controller 31 can specify the relevant logical chunk 410b based on the logical top LBA.

For example, if the logical top LBA to be accessed is decided, the corresponding chunk number will be decided. Specifically speaking, if the logical chunk size is 64 KB (=128 blocks), the logical chunk number n is an integer part of the logical block number m/128 (for example, the logical chunk number having logical blocks with the logical block numbers 0 to 127 is zero, and the logical chunk number having logical blocks with the logical block numbers 128 to 255 is 1).

The virtual volume mapping table 64 associates each virtual chunk 410c of the virtual LDEV 700 with each logical chunk 410b of one or more SPGs. Specifically, the table 64 describes, with respect to each virtual top LBA, identification information (SPG number) of the SPG associated with that virtual top LBA, and the logical top LBA of each SPG associated with the virtual top LBA.

The virtual volume mapping table 64 exists in the memory 350 and is updated by the controller 31 as a storage area is allocated from the SPG 400 or the SPG 400a to the virtual volume 700 in response to write access. The storage area means one or more logical blocks (pages) finally provided by the storage devices (PDEVs) 34.

The storage apparatus 30 can store data written by the host computer 10 in the storage area(s) in the storage devices 34 by allocating the page(s) to the virtual volume(s).

The storage apparatus 30 may be controlled so that one logical chunk will be allocated to different virtual volumes (for example, provision of clone virtual volumes). Different addresses in the same virtual volume may be associated with one logical chunk (for example, duplicate exclusion).

Figure 5:
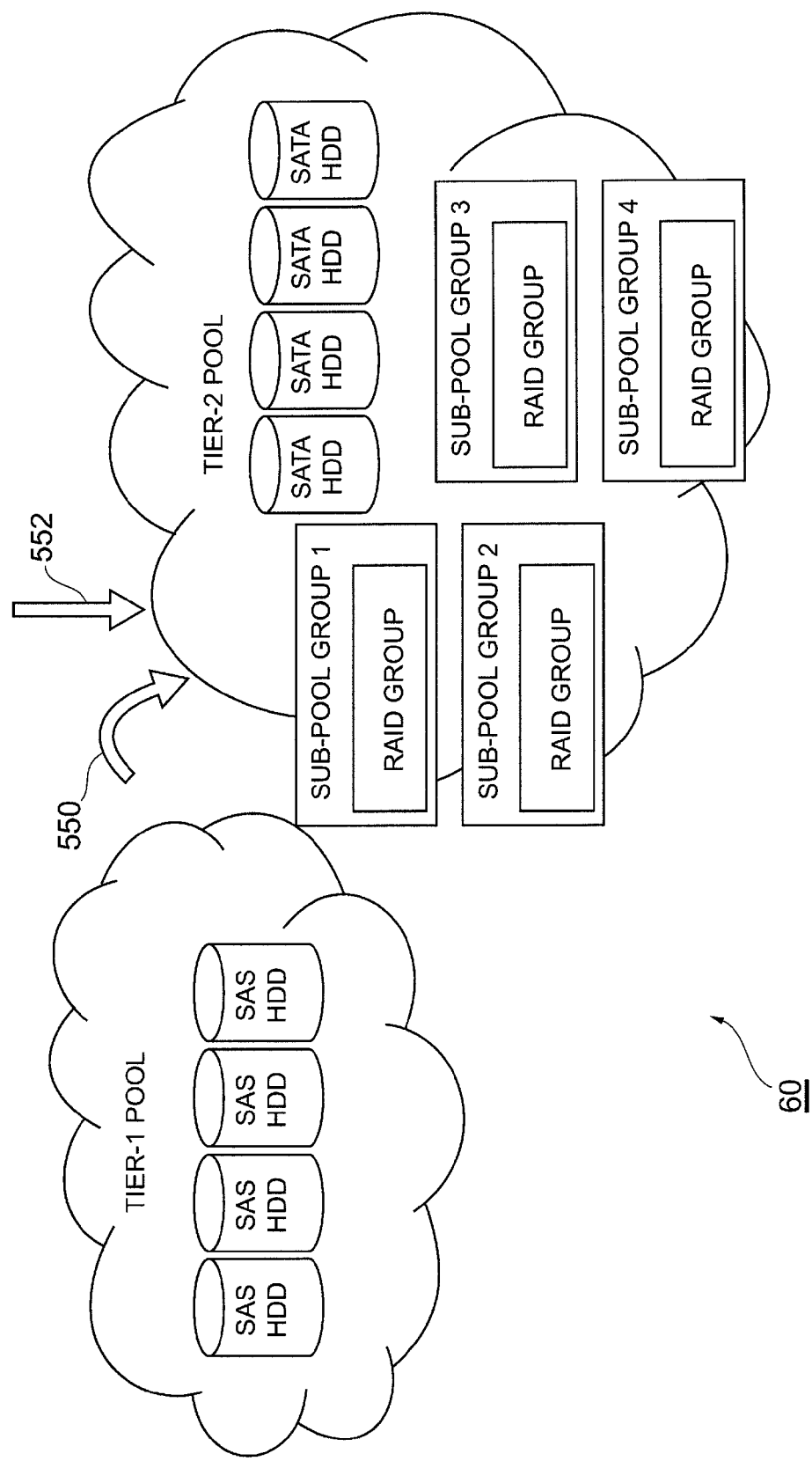
FIG. 5 is a block diagram showing the details of the configuration of a storage pool.

FIG. 5 is a block diagram showing the details of the configuration of the storage pools 60. The pool which provides storage resources in response to write access from the host computer 10 has different attributes because of different types of storage devices. Each pool belongs to one of different tiers.

As the concept of categorizing tiers, for example, the tiers are categorized into Tier-1, Tier-2, and Tier-3. The tiers are given the attributes suited for their intended use as follows: Tier-1 is used for online storage for which a high-speed response is required; Tier-2 is used for nearline storage which prioritizes bit cost over the high-speed use; and Tier-3 is used for low-cost, archive storage for the purpose of data backups. FIG. 5 shows that the pool 60 is constituted from tiers Tier-1 and Tier-2. A pool composed of SAS HDDs is called a Tier-1 pool, while a pool composed of SATA HDDs is called a Tier-2 pool.

A tier is constructed mainly based on the property of the storage devices which provide the storage resource to the pool. Tier-1 is a tier based on online storage devices suited for reading and writing online data to which the host computer 10 always refers to.

Examples of the storage devices suited for Tier-1 are SSD (Solid State Drive), SAS, or Fibre Channel HDDs which have excellent responsibility and reliability. Although introduction/operation costs of these storage devices are expensive, they have the advantage that highly valuable information can be provided fast.

Tier-2 is a tier based on large-capacity, low-cost storage devices storing data which is searched and referred to for the purpose of reuse after it is once used. Since this data is intermediate data between online data and offline data, it is called nearline data. Devices for reading and writing nearline data are nearline storage devices. Examples of storage devices for the nearline storage are SATA or ATA HDDs.

Tier-3 is a tier specialized for storage of offline data which is rarely accessed. Examples of offline storage devices used for this tier are tape drives of good unit prices per capacity or archive-dedicated storage devices.

Incidentally, a tier called Tier-0 which utilizes flash memories (SSD) has emerged recently.

Referring to FIG. 5, the Tier-1 pool provides the online volumes with the storage capacity. Since read or write data is continuously supplied from the host computer 10 to the volumes, the storage apparatus 30 does not apply the MAID, or limits application of the MAID, to the storage devices belonging to the Tier-1 pool.

On the other hand, the Tier-2 pool is used to allocate the storage capacity to the volumes for data whose access frequency is lower than that of the online data. Therefore, although write access is continuously made to those volumes, read access is rarely made to those volumes.

So, the storage apparatus 30 is designed to execute the MAID on a plurality of storage devices belonging to Tier-2, have part of the devices belonging to Tier-2 enter the active mode and executes write access on those devices, and have the rest of the devices make the transition to the power-saving mode.

Write access to Tier-2 includes write access 552 made for new data or update data from the host computer 10 and write access 550 made for data migration from the Tier-1 pool.

In order to allocate the storage areas from the storage devices of the Tier-2 pool equally to write access from the host computer 10 and reduce power consumption by the storage devices, the storage apparatus 30 classifies a plurality of RAID groups in the Tier-2 pool into a plurality of sub-pool groups as shown in FIG. 5 and controls the storage devices constituting the RAID groups in the sub-pool groups to enter the power-saving mode or the active mode so that the (active) sub-pool group whose storage areas can be allocated to the virtual volumes is set to the plurality of sub-pool groups in sequential order and the rest of the sub-groups are set to the power-saving mode.

The sub-pool group(s) will be hereinafter referred to as the SPG(s). An SPG whose storage devices are set to the active mode will be hereinafter referred to as the active SPG, and other SPGs to which the MAID is applied and which are in the power-saving state will be hereinafter referred to as the power-saving SPGs.

The storage apparatus 30 applies the MAID to the SPGs which are not the active SPGs from among the plurality of SPGs.

The MAID is a technique for setting inactive storage devices to the power-saving mode and thereby reducing power consumption.

Representative power-saving modes for storage devices include stopping rotations of a motor for the HDDs, low-speed rotations of the motor for the HDDs, head unload, and power-saving of I/Fs or control packages; and power-saving control can be performed in some of the above-listed power-saving states or by combining the above-listed power-saving states. Recovery time required to change each of the above-listed power-saving states to the active mode is different for each power-saving state; and generally, the longer the recovery time is, the greater the power-saving effect is.

The plurality of SPGs includes normally active SPG(s) to which power-saving management is not applied, and SPGs to which power-saving management is applied and which enters the active mode intermittently. Such distinction between the SPGs may be set and updated by the administrator or the attributes of the SPGs may be updated by the controller 31 according to the state of access processing.

Regarding the RAID group belonging to the active SPG, HDDs are set to the activated state so that they can be used for write or read access. Referring to FIG. 5, the Tier-2 pool is constituted from four SPGs, each of which has one or more RAID groups.

Figure 6:
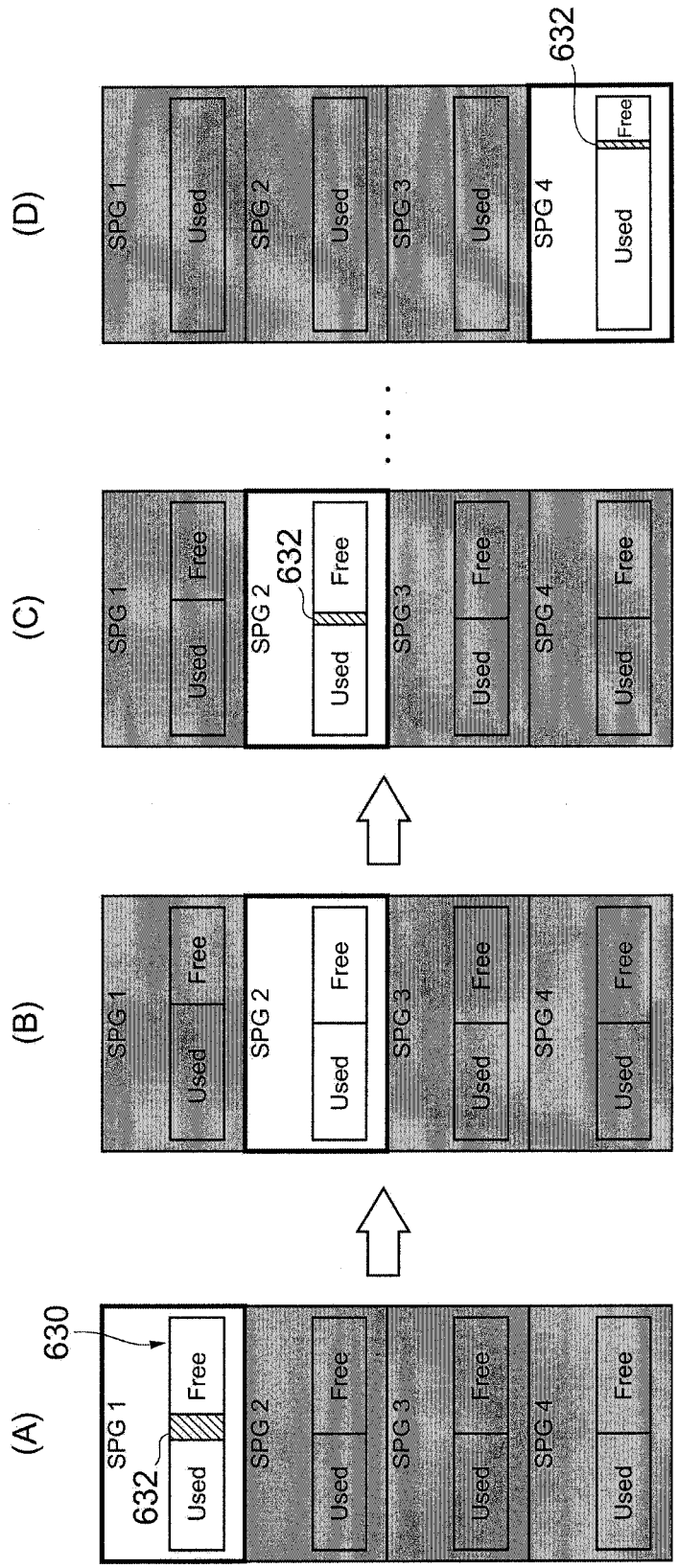
FIG. 6 is a block diagram explaining combined use of thin provisioning and MAID in sub-pool groups.

Next, combined use of the thin provisioning and the MAID in those SPGs will be explained with reference to FIG. 6. FIG. 6 is a block diagram showing the transition between the active mode and the power-saving mode with respect to the plurality of SPGs shown in FIG. 5. In the state shown in FIG. 6(A), SPG1 is an SPG in the active mode and SPG2 to SPG4 are SPGs in the power-saving mode. If is in the active mode, write access from the host computer 10 is executed on the RAID group belonging to SPG1.

A reference numeral 630 represents a block showing a ratio between a used area and an unused area (free area) relative to the full capacity of the storages areas in all the RAID groups belonging to the relevant SPG.

If the storage apparatus 30 determines that the amount of capacity 632 increased by new writing from the host computer 10 to the unused area exceeds a predetermined amount, the storage apparatus 30 changes the status of SPG 2 to the active mode as shown in (B); it allocates the storage areas of SPG 2 to write access from the host computer 10; and monitors the increased amount 632 to SPG 2 as shown in (C) in the same manner as with SPG1. If the SPG 2 makes the transition to the active mode and the processing is switched, the storage apparatus 30 changes the status of the SPG 1 to the power-saving mode.

The storage apparatus 30 sequentially switches the SPG whose status is made to enter the active mode, in the order like

SPG1⇒ SPG2⇒ SPG3⇒ SPG4⇒ SPG1
⇒ ... ⇒ SPG4.

so that the storage capacity of the plurality of SPGs is allocated equally to the virtual volumes, thereby executing the thin provisioning and enabling the power-saving management of the SPGs. There are a plurality of forms of the power-saving mode which can be set to the SPGs. This will be explained later.

Sequential switching of the SPG in the active state is implemented by round robin scheduling. FIG. 6(D) shows the state where the storage areas of SPG1 to SPG3 are used equally and finally write access for new data from the host computer 10 is applied to an unused area in SPG4.

The storage apparatus 30 uses a threshold as a reference for sequential switching of the active SPG. This threshold is decided from the viewpoint of distributing accesses frequency to the plurality of SPGs and consumption capacity of the stored data. In the embodiment shown in FIG. 6, the increased amount of the storage capacity allocated to write access from the host computer 10 is set as the threshold for the active SPG.

If the SPG makes the transition from the power-saving state to the active state and then the newly allocated increased amount reaches the threshold, the storage apparatus 30 changes the status of the next activation candidate SPG (SPG2) from the power-saving state to the active state, switches the virtual volume access object to SPG2, and then changes the status of SPG1 from the active state to the power-saving state. Another example of the threshold is elapsed time after the SPG enters the active mode. The administrator may set either of, or both of, the elapsed time and the newly increased amount as the threshold(s).

Figure 7:
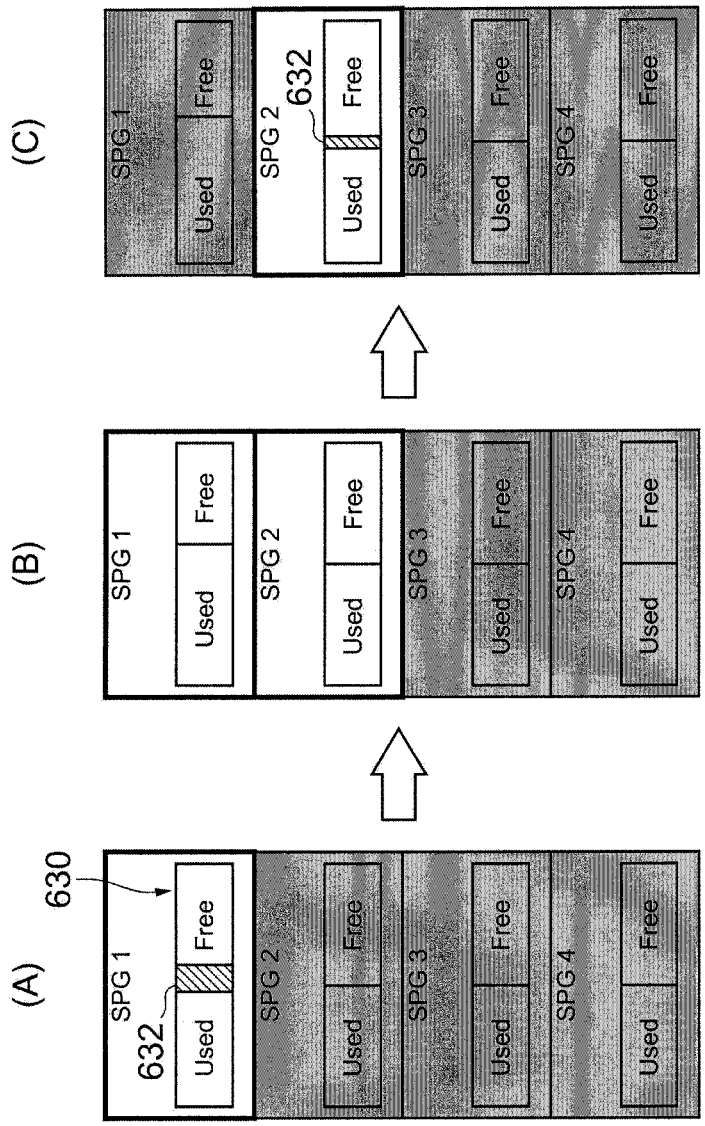
FIG. 7 is a block diagram showing the state transition by switching a SPG(s) in the active state and a SPG(s) in the power-saving state of FIG. 6.

FIG. 7 is a block diagram showing the state transition of FIG. 6. Referring to FIG. 7(A), SPG1 is in the active mode and SPG2 to SPG4 are in the power-saving mode.

A reference numeral 632 represents the newly increased amount of the used area in SPG1. Before changing the status of SPG1 from the active mode to the power-saving mode at specified timing immediately before the newly increased amount reaches the threshold or at any specified previous timing (FIG. 7(A)), the controller 31 executes activating processing on the activation candidate SPG2 and then executes processing for diagnosing each of the storage devices constituting the relevant RAID group belonging to the activation candidate SPG2.

The same activation processing is executed when a plurality of RAID groups exist in the sub-group. Regarding a storage device activation unit, the activation may be executed on a RAID group basis or on a sub-group basis by activating the storage devices belonging to the same sub-group at the same time. If a parity consistency check is performed according to the RAID system, the parity consistency check is performed sequentially for each RAID group.

If it is confirmed that the storage devices belonging to each RAID group of SPG2 are normal, and when the newly increased amount 632 then reaches the threshold (FIG. 7(B)), the controller 31 changes the status of SPG2 from the power-saving mode to the active mode and allocates the unused area of the storage area 630 in SPG2 to new writing from the host computer 10 (FIG. 7(C)).

If data which is not reflected in (or not destaged to) the SPG1 exists in the cache, processing for storing (or destaging) that data to the SPG1 is also executed. When this processing is executed, data transition of high-frequency access data described later is also executed concurrently. When the data transition and the destaging processing are completed, the status of the SPG1 is changed from the active mode to the power-saving mode.

For example, assuming that the above-described threshold is 10 GB, and after the status of SPG1 is changed to the active state and when the increased amount of the used capacity reaches 9 GB (FIG. 7(A)), the storage apparatus 30 activates all the storage devices in the activation candidate SPG2 and executes the processing for diagnosing whether or not each device can be operated normally. This diagnosis may be executed, for example, in the power-saving state of the degree at least capable of performing the diagnosis processing.

If the storage apparatus 30 detects an anomaly in a specific storage device in the activation candidate SPG2 and determines that I/O from the host computer 10 cannot be processed, the storage apparatus 30 executes processing for recovering data stored in that drive to, for example, a spare drive. This processing is executed on the background.

The SPG2 does not make the transition to the power-saving mode until the recovery processing is completed. In this circumstance, the active SPG2 may accept processing requested by the host computer 10 in a degenerate mode or the diagnosis processing may be executed on another next candidate SPG3 and then the status of the SPG3 may be changed to the active mode. In this case, the controller 31 sets the SPG2, which has completed the recovery processing, to be the next active SPG.

If I/O access (update or reading of stored data) to the existing data in the SPG1 continues in the computer, the SPG1 is kept in the active state. Writing of new data is processed on the SPG2. After a certain amount of period has elapsed since I/O from the host computer 10 to the SPG1 stopped, the SPG1 makes the transition to the power-saving mode.

Figure 8:
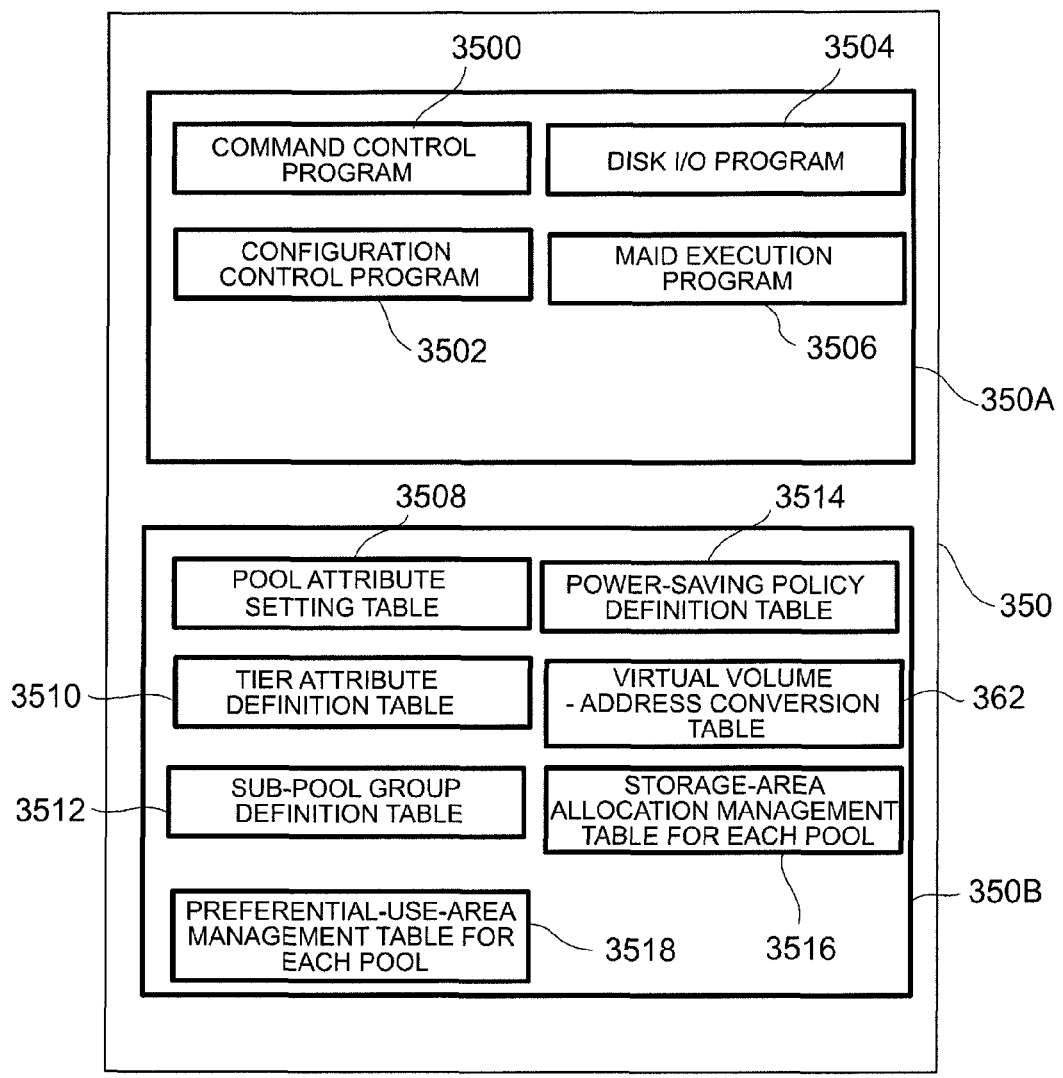
FIG. 8 is a block diagram of the logical configuration of a memory (350) for a storage apparatus (30).

Next, a block diagram of the logical configuration of the memory 350 for the storage apparatus 30 will be explained with reference to FIG. 8. The memory 350 stores programs 350A to be executed by the processor 360, and management tables 350B to which the processor 360 refers.

A command control program 3500 interprets a command (such as a read command or a write command) from the host computer 10 and executes processing (such as reading or writing of data and thin provisioning) defined by that command.

A configuration control program 3502 receives a command from an administrator via the management apparatus 20 or a management terminal and executes processing for, for example, setting or updating the configuration of the storage apparatus 30.

A disk I/O program 3504 controls access to the PDEVs 34.

A MAID execution program 3506 performs power-saving management of the sub-pool group(s) in the pool.

The management tables include: a pool attribute setting table 3508 for setting attributes of pools; a tier attribute definition table 3510 for defining attributes of tiers in the pools; a sub-pool group definition table 3512 for defining sub-pool groups (SPG); a power-saving policy definition table 3514 for defining power-saving policies; a virtual volume—address conversion table 362 for managing allocation of storage areas from the pools to the virtual volumes; a storage-area allocation management table for each pool 3516 for managing allocation of each pool area to the virtual volumes; and a preferential-use-area management table for each pool 3518 for managing areas preferentially used over allocation to the virtual volumes with respect to each pool.

FIG. 9 shows an example of the pool attribute setting table 3508. This table defines the attributes of each of the pools. This table is set by the storage administrator in the memories 330, 350 for the storage apparatus 30.

A pool ID column stores an identifier for distinguishing between the plurality of pools. The pool ID is used as an entry for the pool attribute setting table. A pool attribute column stores an attribute relating to reading or writing of RAID group(s) belonging to the relevant pool. "R/W" means that both reading and writing are possible, and "WORM" means Write Once Read Many. Other attributes such as read-only, encryption, compression, and de-duplication may be set.

A tier segment column stores information for specifying the relevant tier. A column for an SPG(s) belonging to the relevant pool stores an ID(s) of a sub-pool group(s) belonging to the relevant pool. A column for the number of active SPG (s) stores the number of SPG(s) which is made to enter the active mode, from among the SPGs which are objects of the power-saving management in the relevant pool.

An object SPG(s) column stores an ID list of power-saving management object SPG(s). An active SPG(s) column stores an ID list of SPG(s) in the activate state from among the power-saving management object SPGs. An activation candidate SPG(s) column stores an ID list of activation candidate SPG(s) which makes the transition to the active mode next, from among the power-saving management object SPGs.

A MAID attribute column stores control information for specifying the form of power-saving management. "Completely Inhibited" is an attribute prohibiting all the SPGs in the relevant pool from making the transition to the power-saving mode; "Partially Permitted" is an attribute permitting some SPGs in the relevant pool to make the transition to the power-saving mode and prohibiting the remaining SPGs from making the transition to the power-saving mode; and "Completely Permitted" is an attribute permitting all the SPGs in the relevant pool to make the transition to the power-saving mode.

If the MAID attribute is "Partially Permitted" or "Completely Permitted", the controller 31 may dynamically change the range of the SPGs (such as the object SPG(s) and the number of active SPG(s)) to which the power-saving management can be applied, according to the access properties (such as read access frequency).

A power-saving policy column stores information about a link to a power-saving management policy table (3514 in FIG. 14).

Understanding from the pool attribute definition table shown in FIG. 9, the MAID attribute and the number of active SPG(s) are changed according to the relevant tier segment. Since Tier-0 stores data of the highest access frequency, "Completely Inhibited" is set as the MAID attribute to Tier-0. Therefore, no sub-group is set to the Tier-0 pool (pool 1) or one SPG would be enough as the number of SPG(s), if any.

Since the Tier-1 pool (pool 2) stores data of high access frequency, but not as high as the access frequency of data in the Tier-0 pool, "Partially Permitted" is set as the MAID attribute.

If the number of the MAID object SPGs is larger than the number of the MAID non-object SPGs, such situation would be ideal for the power-saving management, but the problem is that read access from the host computer 10 cannot be processed efficiently. On the other hand, if the number of the MAID non-object SPGs is larger than the number of the MAID object SPGs, the results would be opposite to the above-described case. In FIG. 9, the number of the MAID object SPGs is prioritized over the number of the MAID non-object SPGs.

On the other hand, the Tier-2 pool (pool 3) and the Tier-3 pool (pool 4) store nearline data or archive data, "Completely Permitted" is set as the MAID attribute.

The number of active SPG(s) with regard to all the SPGs in the relevant pool is determined in order to ideally process access from the host computer 10. Since the access frequency from the host computer 10 to a higher tier is higher, a large number of active SPG(s) are set to the higher tier rather than the lower tier.

Figure 10:
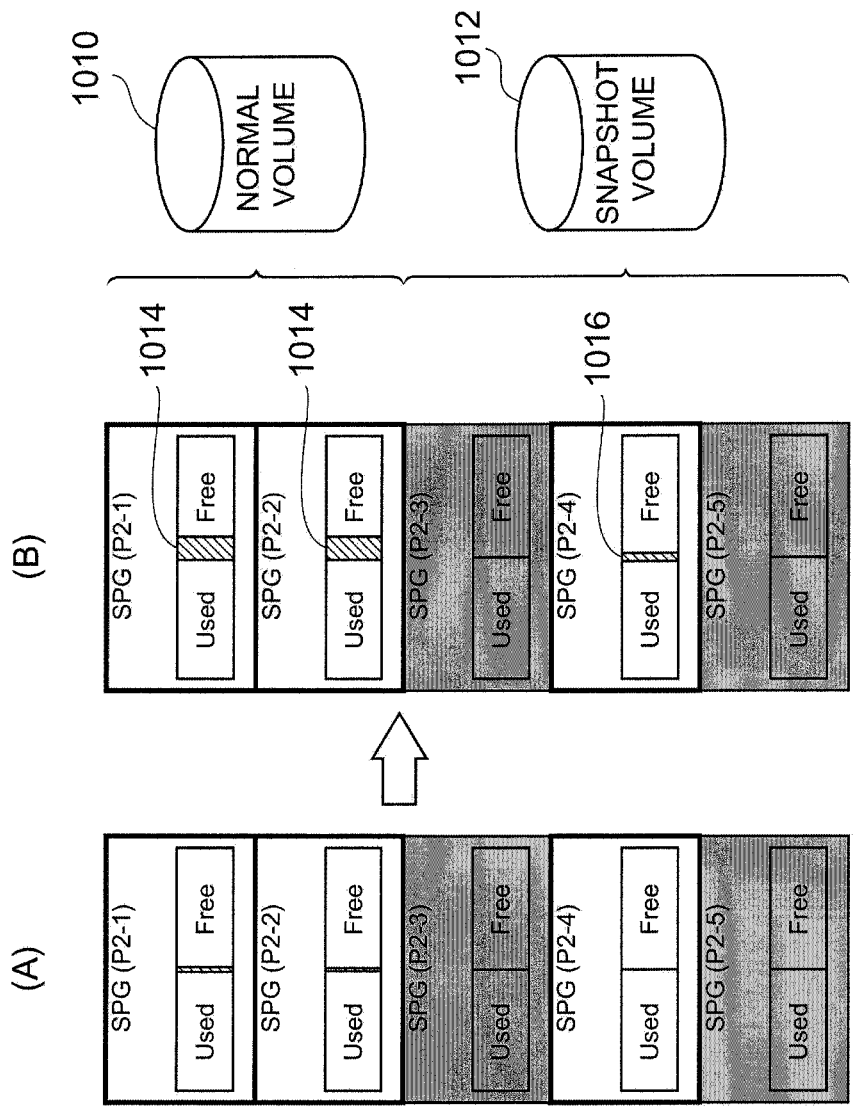
FIG. 10 is a block diagram showing an example of the setting of sub-pool groups (SPGs), which are power-saving management objects, with respect to a plurality of sub-pool groups.

An SPG setting example according to the definition of the Tier-1 pool (pool 2) in FIG. 9 will be explained with reference to FIG. 10. As can be seen from FIG. 9, SPG (P2-1) to SPG (P2-5) exist as SPGs in the pool 2.

The MAID is not applied to SPG (P2-1) and SPG (P2-2). The storage devices are always active in these SPGs. The storage apparatus 30 allocates storage areas from SPG (P2-1) and SPG (P2-2) in response to access from the host computer 10 to a normal volume (online volume) 1010.

The MAID is applied to SPG (P2-3) to SPG (P2-5). As a preferred example, SPG 3 to SPG5 are allocated to a snapshot volume 1012 to which only pre-update data is normally written as a result of write access from the host computer 10 to online volumes, and to which read access is rarely made.

FIG. 10(A) shows the state where the status of SPG (P2-3) is changed from the active mode to the power-saving mode and the status of SPG (P2-4) is changed from the power-saving mode to the active mode (SPG (P2-5) is in the power-saving mode). FIG. 10(B) shows the state after a specified period of time has elapsed since the state of FIG. 10(A).

While the state transition is made from (A) to (B), an increased storage capacity amount 1014 in response to access from the host computer 10 is distributed and applied to each of SPG (P2-1) and SPG (P2-2) and an increased storage capacity amount 1016 of pre-update data (COW: Copy On Write) in response to update access from the host computer 10 is applied only to SPG (P2-4) whose status has changed from the power-saving mode to the active mode, from among SPG (P2-3) to SPG (P2-5).

The capacity per SPG and the number of RAID groups can be set to each SPG as appropriate. For example, a larger number of RAID groups are set in the MAID non-object SPGs (SPG (2P-1), SPG (2P-2)) than the MAID object SPGs (SPG (P2-3) to SPG (P2-5)).

Referring to FIG. 9, the pool 2 defined in Tier-1 has the power-saving effect of (the total number of SPG(s)−(the number of MAID non-object SPG(s) (P2-1 and P2-2)+the number of MAID object, active SPG(s) (P2-3))/the total number of SPG(s)=(5−(2+1))/5=40%; the pool 3 defined in Tier-2 has the power-saving effect of (the total number of SPG(s) (belonging to SPG P3-1 to P3-8)—the number of active SPG(s) (P3-1 and P3-2))/the total number of SPG(s)=(8−2)/8=75%; and the pool 4 defined in Tier-3 has the power-saving effect of (the total number of SPG(s) (belonging to SPG P4-1 to P4-16)−the number of active SPG(s) (P4-1))/the total number of SPG(s)=(16−1)/16=94%.

The administrator of the storage apparatus 30 sets the pool attribute setting table 3508 in the memories 330, 350 for the storage apparatus 30 by using a GUI for the management apparatus 20 or a management terminal. The MAID execution program 3506 for the storage apparatus 30 updates the active SPG(s) and the activation candidate SPG(s) in the pool attribute setting table 3508 according to switching of the active SPG(s).

The MAID execution program 3506 can dynamically change a ratio of the number of active SPG(s) to the number of object SPG(s) according to frequency of write access and/or read access from the host computer 10 with respect to the pool(s) to which the power-saving management is applied.

For example, if the read access frequency increases, a ratio of the number of active SPG(s) to the number of object SPG(s) is increased. The changed degree of this ratio is decided by the MAID execution program 3506 according to the balance between the power-saving effect and the responsibility to access from the host computer 10. A function that sets whether a change in the ratio of the number of active SPG(s) to the object SPG(s) is permitted or not can be set to the management programs on the administrator side.

Figure 11:
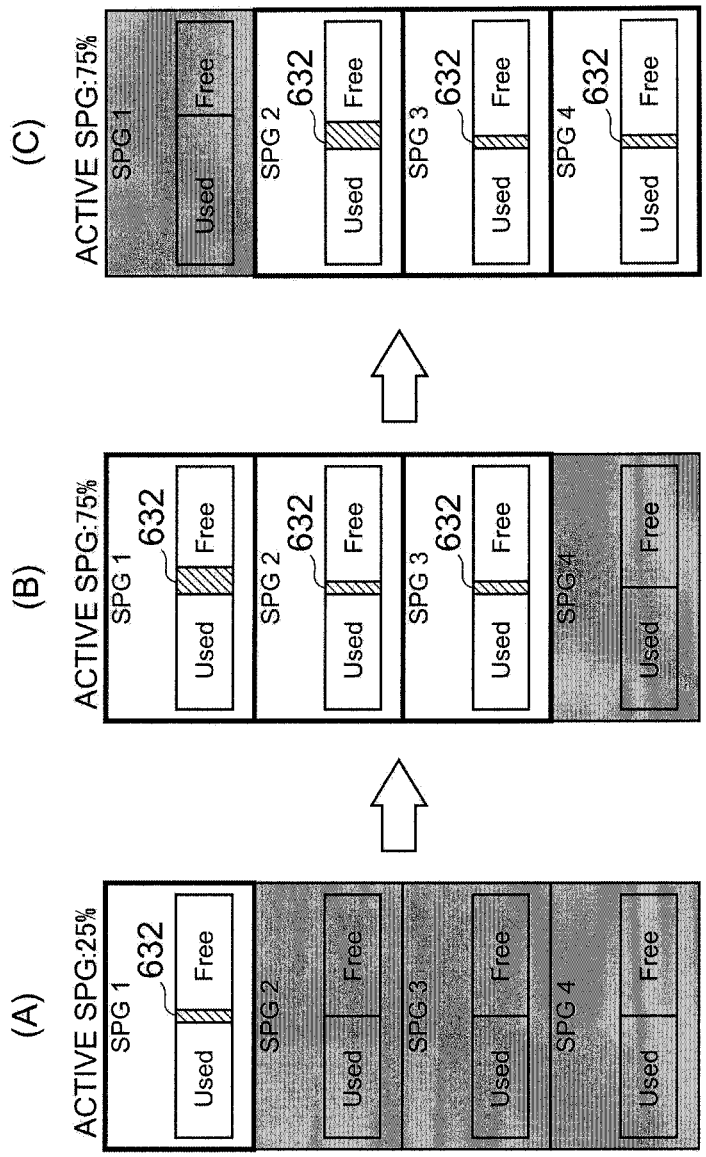
FIG. 11 a block diagram showing the state where deterioration of access performance due to an increase in the number of sub-pool groups in an active mode is prevented.

FIG. 11 is a block diagram showing the state where the number of active SPG(s) increases. The command control program 3500 analyzes a command from the host computer 10; and if the read access frequency exceeds a specified threshold, the command control program 3500 sends this information to the MAID execution program 3506.

The MAID execution program 3506 adds SPG2 and SPG3, as active SPGs in the object SPGs (SPG1 to SPG4), to the original active SPG1 (FIG. 11(A) and sets the additional setting (FIG. 11(B)) to the pool attribute setting table 3508 (FIG. 9). Based on this setting, the MAID execution program 3506 executes activation control and power-saving control of all the SPGs.

Since the number of active SPG(s) is one in all the SPGs (four SPGs) in the form shown in (A), time loss in changing the status of the SPG from the power-saving mode to the active mode may occur upon random read access to the pool with a probability of 75% (however, with respect to only the first access to the power-saving SPG).

On the other hand, the percentage of read access by which time loss occurs, relative to all the read accesses is improved to 25% in the form shown in (B). For example, if the operation is performed so that the number of read accesses increases depending on hours of the day, it is possible to adapt to the needs of the users by making the setting in advance so that the number of active SPGs is increased when certain time when an increase of accesses is expected has come. However, as opposed to the above-described improvement, the power-saving effect will be lost. Therefore, if the storage apparatus 30 detects a reduction of the read access frequency, it reduces the number of active SPG(s).

If the newly allocated increased amount 632 of the active SPG1 reaches the threshold in FIG. 11(B), the storage apparatus 30 changes the status of SPG1 to the power-saving state and also changes the status of SPG4 from the power-saving mode to the active mode (FIG. 11(C)). But, SPG2 and SPG3 remain to be in the active state. In the case where there are a plurality of active SPGs, the storage apparatus 30 allocates the newly allocated capacity equally to the plurality of the active SPGs.

There are possible two types of switching processing when there are a plurality of active SPGs, as follows:

(1) Activate a plurality of next candidate SPGs at the same time.

This method is the same as the method in a case where there is only one SPG. Since the number of SPGs is simply increased, the plurality of active SPGs are switched to a plurality of next candidate SPGs after the completion of activation and diagnosis; and after the cache is flashed, the plurality of the former active SPGs are made to make the transition to the power-saving mode.

(2) Activate a plurality of next candidate SPGs one by one by shifting time for each SPG and sequentially switch the activated, next candidate SPG to one of the plurality of active SPGs.

As compared to the case (1), this method is performed in such a manner that the active SPGs are gradually switched (step by step). For example, since there is a high possibility that data which has been just stored tends to be accessed, this method has the advantage that a probability reactivation loss occurrence, which would be expected due to access to data in a SPG whose status has just been changed to the power-saving mode, will be reduced to the reactivation loss occurrence probability for as many as the active SPGs.

As data is stored equally in each SPG, the threshold which serves as a trigger for switching of the SPG may be set as the amount that one SPG may reach, or as the total increased amount of the plurality of SPGs.

Also, regarding the threshold of elapsed time, the threshold for the case (1) is the same as the case where there is one SPG; and in the case (2), the administrator may arbitrarily set, aside from the above threshold, time required after activating one SPG until activating the next SPG or the threshold may be automatically set by dividing the above threshold of elapsed time by the number of the active SPG(s).

FIG. 12 shows an example of the tier attribute definition table 3510. The administrator of the storage apparatus 30 sets this table in the memories 300, 350 for the storage apparatus 30 via the management apparatus 20 or the management terminal.

The Drive column of this tier attribute definition table 3510 stores drives type that constitute each Tier. An I/F column stores protocol applied to the relevant drive. A data transfer speed of each drive is also defined by this table.

I/O priority (1) is priority (level setting) for host I/O processing by the controller 31 when the controller 31 is under high load; and I/O priority (2) expresses the percentage of occupancy for each time.

Cache occupancy is occupancy in the cache memory for each tier. A migration threshold is a reference used to migrate data to a higher or lower tier and is defined by the access frequency from the host computer 10. If the access frequency to a specified tier is equal to or less than the threshold for the access frequency to the specified tier, data in a pool of that tier will be migrated to a pool of a lower tier than a specified tier; and if the access frequency to the specified tier exceeds a threshold, data in the pool of the current tier will be migrated to the pool of the higher tier. Incidentally, the migration threshold is not limited to this example and upper limit and lower limit thresholds may be set for each tier.

FIG. 13 is the SPG definition table 3512. The storage administrator sets this table to the memories 330, 350 for the storage apparatus 30. This table stores SPG definition information for each pool and shows the status of each SPG at the current time.

An SPG ID column stores an identifier of the relevant SPG. A RAID Gr.# column stores identifiers of RAID groups belonging to the relevant SPG. An SPG capacity column stores a total capacity of all the RAID groups belonging to the relevant SPG.

A status column stores the current status of the relevant SPG. The status is classified broadly into the states of "Active", "Being Diagnosed", "Being Activated", and "PowerSaving modes". The status relative to the SPG ID of each pool in FIG. 13 corresponds to FIG. 9 described earlier.

"Active" means that the relevant SPG is in operating state (accessible state); "Being Diagnosed" means that the relevant SPG is being diagnosed; "Being Activated" means that the storage devices are being activated in order to switch the status of the relevant SPG from the power-saving mode to the active mode; and each of "Idle-1", "Idle-2", "Standby", and "Sleep" indicates a specific form of the power-saving mode.

"Idle-1" is a power-saving state caused by head unloading of HDDs and its response delay time is 1 ms. The storage apparatus 30 can reduce power consumption by 10% by setting the status to "Idle-1", as compared to power consumption in the state where the HDDs are in the active mode.

"Idle-2" is a power-saving state caused by low disk rotation of the HDDs and its response delay time is several seconds. Power consumption can be reduced by 30% by setting the status to "Idle-2".

"Standby" is a power-saving mode caused by HDD disk rotation stop (response delay time: several tens of seconds) and its power consumption saving reduction effect is 60%.

"Sleep" is the state where an interface or similar is made to enter the power-saving mode in addition to the "Standby" state; its delay time is additional +1 to 2 seconds, but its power-saving effect reaches 80%. Incidentally, it is possible to cut off the power supply to the HDDs only in the "Sleep" state. The power-saving effect in this case is 100%; however, when reactivating the HDDs, additional several seconds of delay time is required because processing for self-diagnosis of the HDDs and external force correction is executed.

In addition to the above-described power consumption reduction effect, the storage apparatus 30 may manage the status of HDD mounting unit fans (such as high-speed rotation/normal rotation/low-speed rotation/stop) according to a power-saving policy table 3514 described later (FIG. 14) together with the MAID management of the HDDs.

An allocated capacity in FIG. 13 means the capacity allocated to the virtual volumes, that is, the used capacity.

An increased allocated capacity means the used capacity that is newly allocated to, and increased for, the virtual volumes after switching of the active SPG, and is information compared with the threshold. The increased capacity may be defined by an absolute capacity or otherwise defined by a proportion to the whole capacity. Elapsed time means a period of time elapsed after the status of the relevant SPG is switched to the active state.

Incidentally, the storage administrator can set times of day or days of the week instead of the elapsed time as the aforementioned threshold. This is effective when the number of SPGs whose status is to be changed to the active mode according to a schedule.

Incidentally, if the number of active SPG(s) is more than one as in the pool 3, the storage apparatus 30 performs switching of the active SPGs on by one or for a set of SPGs at the same time.

Furthermore, only one SPG is set to the pool 1. Since one SPG is equivalent to the pool itself in terms of management, the administrator may omit the definition of one SPG for the pool 1.

Also, for example, the number of RAID groups, the number of constituent HDDs/SSDs of a RAID group, or the RAID level may be different between the MAID non-object SPG(s) and the object SPG(s). Moreover, the above-mentioned number of RAID groups may be different between the respective SPGs. Furthermore, tiers may be set in a pool by having SPGs of different tier segments belong to the same pool.

FIG. 14 is an example of the power-saving policy table 3514. The administrator sets this table to the memories 330, 350 for the storage apparatus 30. A policy ID is an entry for identifying a policy.

A transition condition is the type of a threshold used when switching the status of an active SPG to an activation candidate SPG. The transition condition is defined by, for example, the capacity, elapsed time, and date and time. The threshold means a condition or a reference value for switching the active SPG.

A power-saving mode to which transition can be made defines to which power-saving mode the relevant SPG in the active mode makes the transition. The column for the power-saving mode to which transition can be made includes the setting for power-saving of the fans.

An activation candidate state defines to which power-saving mode the relevant activation candidate SPG should make the transition during the course of the transition from the power-saving mode (the power-saving mode to which transition can be made) to the active mode. The activation candidate state is set as appropriate from among, for example, the power-saving modes positioned between the power-saving mode to which transition can be made, and the active mode.

For example, if the power-saving mode to which transition can be made is "Standby" and the activation candidate state is "Idle-2" as in the case of a policy "PMT-2", the status of the relevant SPG is changed to the "Idle-2" mode during the course of the transition from "Standby" to the "Active" mode so that the hardware part of the storage devices belonging to the SPG can be diagnosed before the status of the SPG is changed to the active mode.

High-frequency access data migration is management information used by the storage apparatus 30 to migrate data of high access frequency from the tier, to which that data belongs, to a higher tier or to the MAID non-object SPG or the next active SPG within the same tier while the relevant SPG is in the active mode.

Access frequency is frequency of access (read access in particular) to the same block while the relevant SPG is in the active mode. If the command control program detects this frequency, data of the relevant access object block will be migrated to a power-saving non-object SPG or to the active SPG defined as a destination.

Next, an example of the virtual volume—address conversion table 362 will be explained with reference to FIG. 15. The command control program 3500 updates this table when allocating storage areas from a pool to write access to a virtual volume(s) (virtual VOL).

A virtual volume ID of a write object, a top logical block address (LBA) of a write area, and the block length of write data are registered in this table as information about writing from the host computer 10.

As information about the relevant pool, a pool ID, a page number, an entry as link information to an area mapping table for each pool (FIG. 16), the number of consumed entries, time when the relevant page was newly allocated from the relevant pool to a virtual volume (newly allocated time), the last time when the relevant page was updated (last update time), and an accumulated count of accesses to the relevant page are registered in the table.

This accumulated access account value is necessary for the disk I/O program 3504 to judge whether data migration between a plurality of tiers is needed or not. For example, a policy for the pool 2 is "PMT-1" according to the pool attribute setting table (FIG. 9) and the threshold (access frequency) is 5 times according to the power consumption policy table (FIG. 14). A 10 times access count is recorded for the access object area (page number: 00000001h) of the pool 2.

Since the count exceeds the threshold, the disk I/O program 3504 recognizes that continuous access to the access object can be predicted; and then migrate data in the access object area to an area where the continuous access can be processed. The area where the continuous access can be processed is at least one of a power-saving non-object SPG, a pool to which power-saving cannot be applied, and the next candidate SPG.

FIG. 16 is an example of the storage-area allocation management table 3516 for each pool. In response to write access to a virtual volume, the command control program 3500 maps the area belonging to the active SPG (P2-3: see FIG. 9) in the pool 2, updates the virtual volume—address conversion table in FIG. 15, and then registers the mapped area of the RAID group (RAID Gr.13) belonging to SPG2-3 in the pool-storage-area allocation management table 3516 in FIG. 16.

The information in the table shown in FIG. 16 is associated with the table shown in FIG. 15 via the entries. An entry in FIG. 15 is set for each write access. As shown in FIG. 16, a block of each entry is set for each specific block length (100h) of write data.

It can be seen that the table shown in FIG. 15 and the table shown in FIG. 16 are associated with each other via the entry "P0001". Data with the block length 040h for the LBA (00000000h) of a virtual volume (ID: VVOL1) is stored in a mapping area composed of a page in the pool 2 (page number: 00000000h).

The area in the pool 2 which is used to store the above-mentioned data is at a physical LBA (00000000h: top position of the relevant page) of a drive (ID: R13-1) for the RAID group (ID: 13) belonging to the active SPG (ID: P2-3). This physical LBA corresponds to the top position of the relevant page. Since the block length of used data is 040h, an unused capacity (0C0h) are exists in the area occupied by the relevant page.

Data with the block length 300h (equivalent to 3 pages) exists for an entry "P0002" in FIG. 15. Therefore, the command control program 3500 allocates three pages to the virtual volume (ID: VVOL1). The command control program 3500 allocates the physical LBA of each drive R13-2, R13-3, R13-4 to one page in order to store the data equally in the plurality of drives for the SPG (ID: P2-3).

As a result, three blocks exist for the entry "P0002" in FIG. 16. Incidentally, offset is effective in referring to data where a plurality of pieces of data are stored (mapped) in the same page.

Since the access count for the area of the entry ("P0002") in FIG. 15 exceeds the threshold, for example, when switching the active SPG from P2-3 to P2-4, the disk I/O program 3504 migrates the data in that area to an SPG where the host computer 10 can access continuously. The migration destination SPG is a power-saving non-object SPG or the next candidate, active SPG.

FIG. 17 is a storage-area allocation management table 3516 for the pool 2 when data of a RAID group (13) in the SPG (P2-3) has been migrated to a RAID group (5) of the power-saving non-object SPG (P2-1) in the same pool (pool 2). It can be recognized from FIG. 9 that the SPG (P2-1) is not the object of power-saving.

The disk I/O program 3504 migrates data with the block length 100h from a physical LBA (00000000h: top address) of a drive (R13-2) for the RAID group (13) of the SPG (P2-3) to a page area with the block length 100h from a physical LBA (00080000h: top address) of a drive (R5-1) for the RAID group (5) of the SPG (P2-1).

Along with the execution of this migration processing, the disk I/O program 3504 changes the table from what is shown in FIG. 16 to what is shown in FIG. 17. The allocation management information about other blocks for the entry "P0002" is updated as shown in FIG. 17.

As a result, the host computer 10 can continuously access the object data to read the migrated data even when it accesses the virtual volume (ID: VVOL1) after the status of the SPG (P2-3) is changed to the power-saving mode.

On the other hand, FIG. 18 is the storage-area allocation management table 3516 for the pool 2 when the data migration destination is a power-saving object SPG and the data migration source is an SPG whose status is changed from the active mode to the power-saving mode. Referring to FIG. 9, it can be recognized that the next SPG to be made to enter the active mode following the SPG (P2-3) is P2-4.

The disk I/O program 3504 migrates data (the first block of the entry "P0002" in FIG. 16) on the drive (R13-2) of the RAID group (13) in the SPG (P2-3) to an area (the first block of the entry "P0002" in FIG. 19) on a drive (R21-1) of a RAID group (21) in the SPG (P2-4). Data migration relating to other blocks is as shown in FIG. 16 and FIG. 18.

The disk I/O program 3504 confirms that the data migration destination area is not registered in the virtual volume—address conversion table (FIG. 16); and then executes data migration. The disk I/O program 3504 clears the access count as it updates the virtual volume—address conversion table 362.

As the MAID execution program 3506 switches the active SPG, it changes the status in the pool attribute setting table 3508 (FIG. 9). As the command control program 3500 executes thin provisioning (new allocation) on the active SPG, it changes the allocated capacity in the sub-pool group definition table 3512 (FIG. 13).

The disk I/O program 3504 registers the migration source area information in the preferential-use-area management table 3518 for the pool 2. FIG. 19 is an example of that table for the pool 2.

The area information about the data migration source entry "P0002" in FIG. 16 is registered in each block in FIG. 19. When the status of the SPG (P2-3) is changed to the active mode next time, the command control program 3500 prioritizes the area registered in FIG. 19 over other areas and allocates that area to new data write access from the host computer 10. If that area is used, the command control program 3500 deletes the area information from the table (FIG. 19).

Incidentally, the disk I/O program 3504 can use the data migration source area for deflagging instead of allocation to the new data write access.

Figure 20:
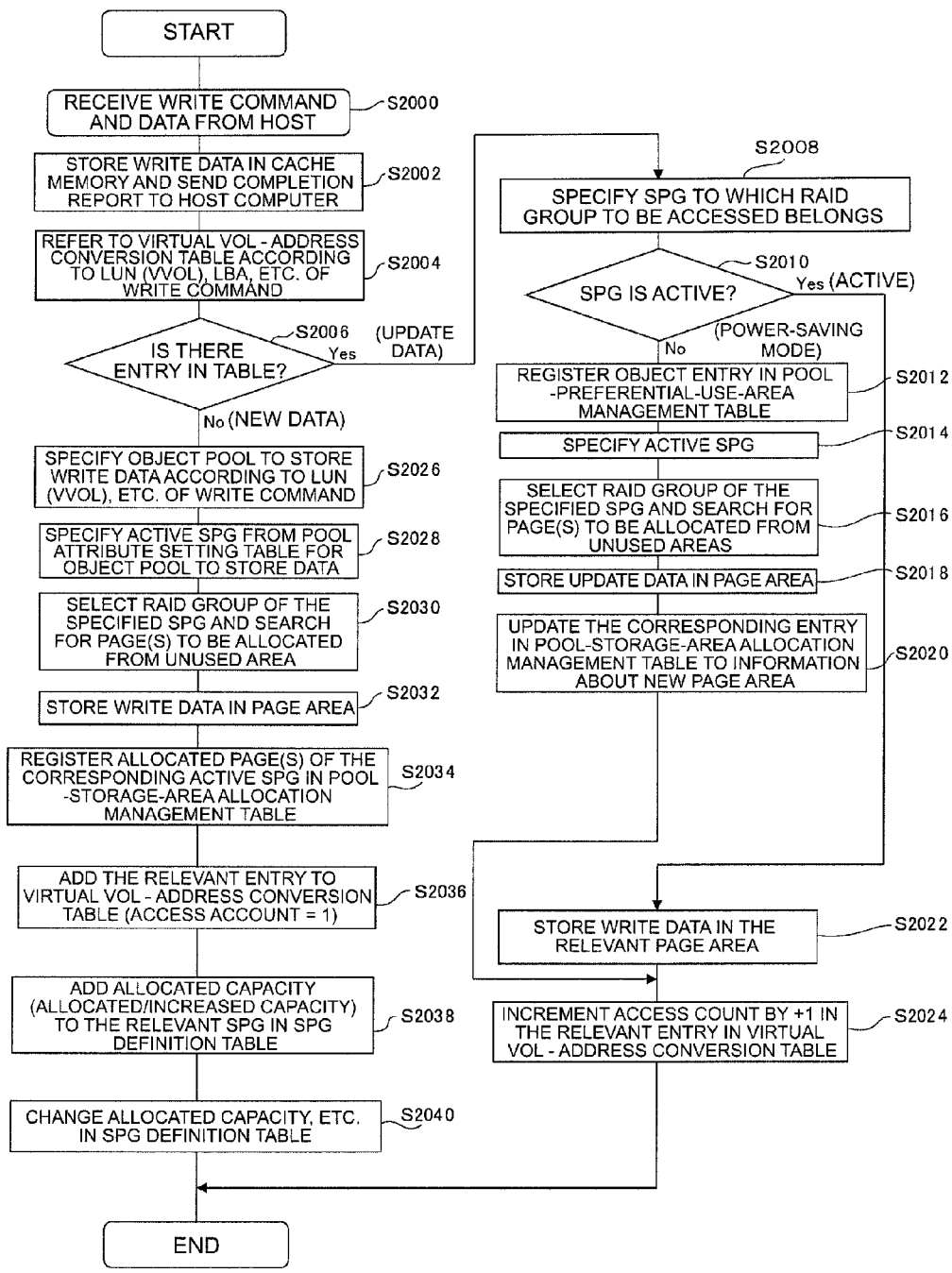
FIG. 20 is a flowchart illustrating write processing by the storage apparatus (30).

Next, write processing by the storage apparatus 30 will be explained with reference to a flowchart in FIG. 20. This flowchart is executed by the controller 31 according to the command control program 3500. The flowchart may be explained by referring to the program as one executing the flowchart.

After the controller 31 receives a write command and write data from the host computer 10 (S2000), it stores the write data in the cache memory 32 and sends a write completion report to the host computer 10 (S2002).

The controller 31 refers to the virtual volume—address conversion table 362 (FIG. 15) according to the LUN (VVOL), LBA, etc. of the write command (S2004) and then checks if there is an entry in that table (S2006).

If there is an entry, the controller 31 determines that the write data is update data; and refers to the pool-storage-area allocation management table 3516 (FIG. 16) and specifies the SPG to which the write object RAID group belongs (S2008). Next, the controller 31 refers to the SPG (sub-pool group) definition table 3512 (FIG. 13) and detects the SPG attribute status (S2010).

If the controller 31 determines that the SPG is active, it stores the write data in the write-accessed page area in the SPG (S2022) and increments the access count for the relevant entry in the virtual volume—address conversion table 362 (FIG. 15) by +1 (S2024), thereby terminating the processing.

If the controller 31 determines in step S2010 that the SPG is in the power-saving mode, it does not make this SPG active, but writes the update data in another active SPG. It registers, in the preferential-use-area management table 3518 for the pool for this SPG, RAID group information about the SPG corresponding to the entry for the write destination area in the virtual volume—address conversion table 362 and releases the write destination area (S2012).

Next, the controller 31 refers to the pool attribute setting table 3508 (FIG. 9) with regard to the pool corresponding to the entry and specifies an active SPG (S2014). If there are a plurality of active SPGs, an active SPG(s) with a smaller used capacity is selected.

The controller 31 further selects a RAID group from the specified SPG and searches for a page(s) to be allocated from unused areas to the update data (S2016). Incidentally, if a preferential use area 3518 (FIG. 19) is set in the specified SPG, the controller 31 prioritizes the use of a page(s) in this area.

Next, the controller 31 stores the update data in the searched page area (S2018) and updates the relevant entry in the pool-storage-area allocation management table 3516 to information about the new page area for the active SPG (S2020).

The controller 31 increments the access count for the relevant entry in the virtual volume—address conversion table 362 by +1 (S2024) and terminates the processing. Incidentally, in a case of overwrite update (when the SPG is active), the allocated capacity is not changed.

If there is no entry in S2006 described above, the controller 31 determines that the write object data is new data; and it specifies the object pool for storing the write data from LUN (VVOL) information included in the write command (S2026).

The controller 31 refers to the pool attribute setting table 3508 (FIG. 9) with respect to the data storage object pool, specifies the active SPG (S2028), selects a RAID group from the specified SPG, and searches for a page(s) from unused areas of the RAID group (S2030). The controller 31 further stores the new write data in the page area (S2032) and registers information about the page area in the pool-storage-area allocation management table 3516 (FIG. 16) (S2034).

Then, the controller 31 adds the entry in the pool-storage-area allocation management table 3516 (FIG. 16) for the pool area storing the new data to the virtual volume—address conversion table 362 (FIG. 15) and sets 1 to the access account (S2036).

Furthermore, the controller 31 adds the allocated capacity and the increased capacity corresponding to the SPG storing the new data to the SPG definition table 3512 (FIG. 13) (S2038). Then, the controller 31 changes the allocated capacity of the SPG, whose page(s) has been used, in the SPG definition table 3512 (FIG. 13) (S2040) and terminates the processing.

Figure 21:
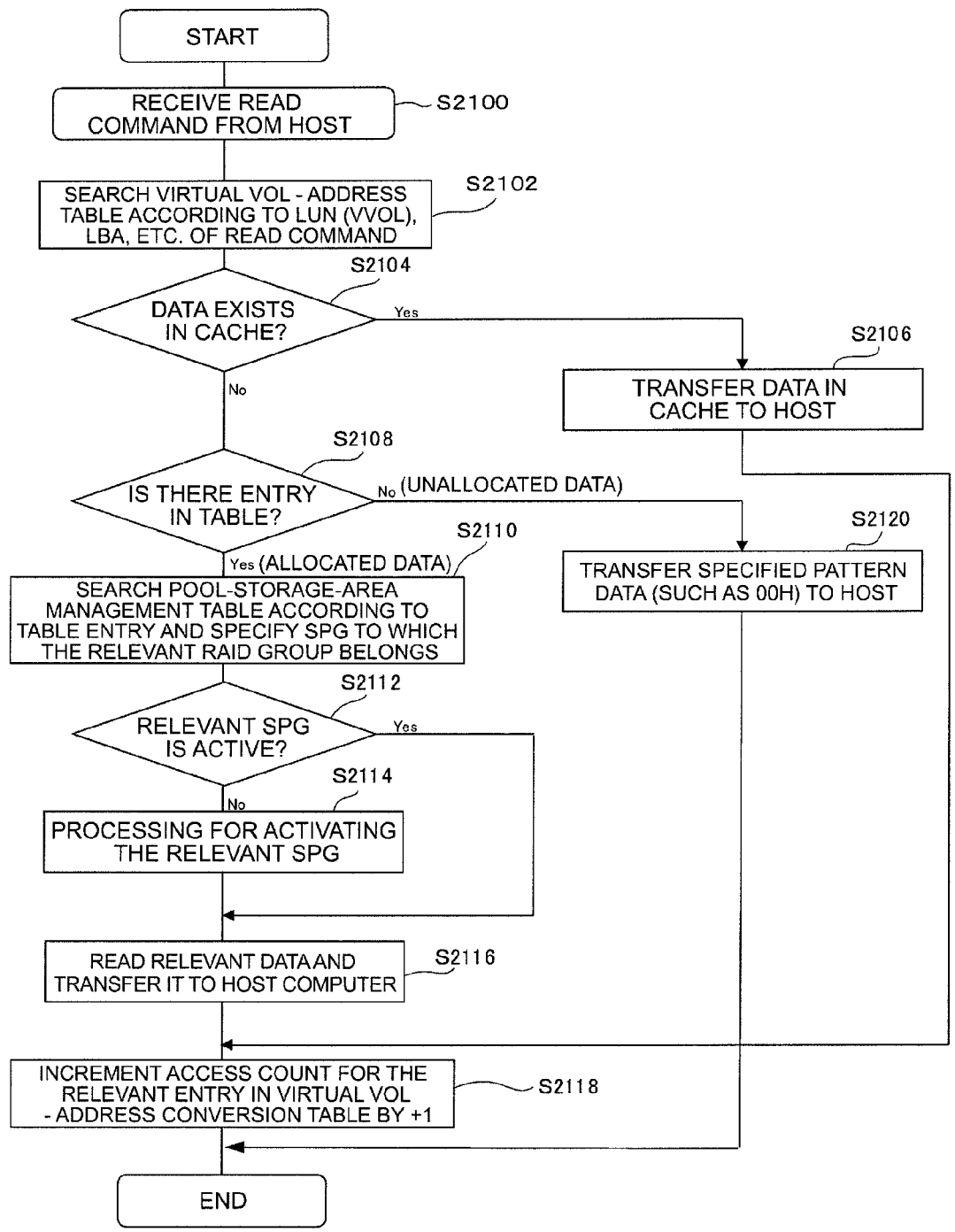
FIG. 21 is a flowchart illustrating read processing by the storage apparatus (30).

Next, read processing by the storage apparatus 30 will be explained with reference to a flowchart in FIG. 21. The controller 31 which executes the command control program 3500 is one that executes this flowchart. Incidentally, for convenience of explanation, the program may be explained as one executing the flowchart.

After the controller 31 receives a read command from the host computer 10 (S2100), it refers to the virtual volume—address conversion table 362 (FIG. 15) (S2102) and checks if there is read object data in the cache memory 32 (S2104). If the controller 31 detects a cache hit, it transfers data in the cache to the host computer 10 (S2106).

The controller 31 then increment the access count for the corresponding entry in the virtual volume—address conversion table 362 by +1 (S2118).

If the controller 31 detects a cache miss, it checks whether or not there is an entry for the read object data in the virtual volume—address conversion table 362 (FIG. 15) (S2108). If the controller 31 detects no entry, it determines that it is read access from the host computer 10 to a page(s) to which write data is not allocated; and transfers a specified pattern data (such as 00h) to the host computer 10 (S2120).

On the other hand, if it is determined that there is an entry (S2108), the controller 31 recognizes that it is read access to a page(s) allocated to the write data; and refers to the pool-storage-area allocation management table 3516 for a pool corresponding to the entry (FIG. 16) and specifies an SPG to which the RAID group for the allocated page(s) belongs (S2110).

Next, the controller 31 refers to the SPG definition table 3512 (FIG. 13) and judges whether the SPG is active or not (S2112). If it is determined that the SPG is not active, the controller 31 executes processing for activating the SPG (S2114), reads data from the corresponding page in the object RAID group of the SPG, and transfers it to the host computer 10 (S2116).

Furthermore, the controller 31 increments the access count for the entry in the virtual volume—address conversion table 362 (S2118).

Figure 22:
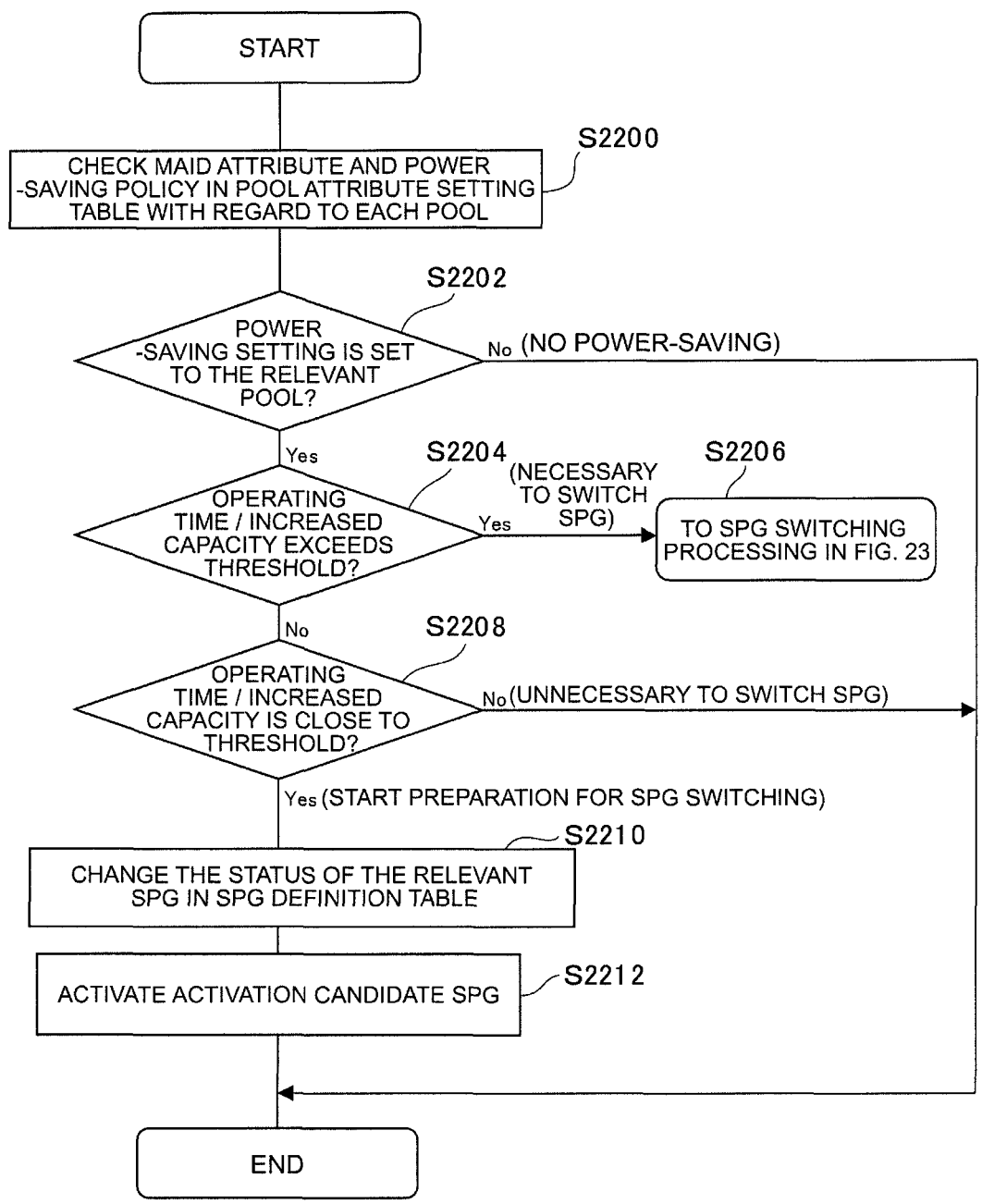
FIG. 22 is an overall flowchart illustrating active sub-pool group switching processing.
Figure 23:
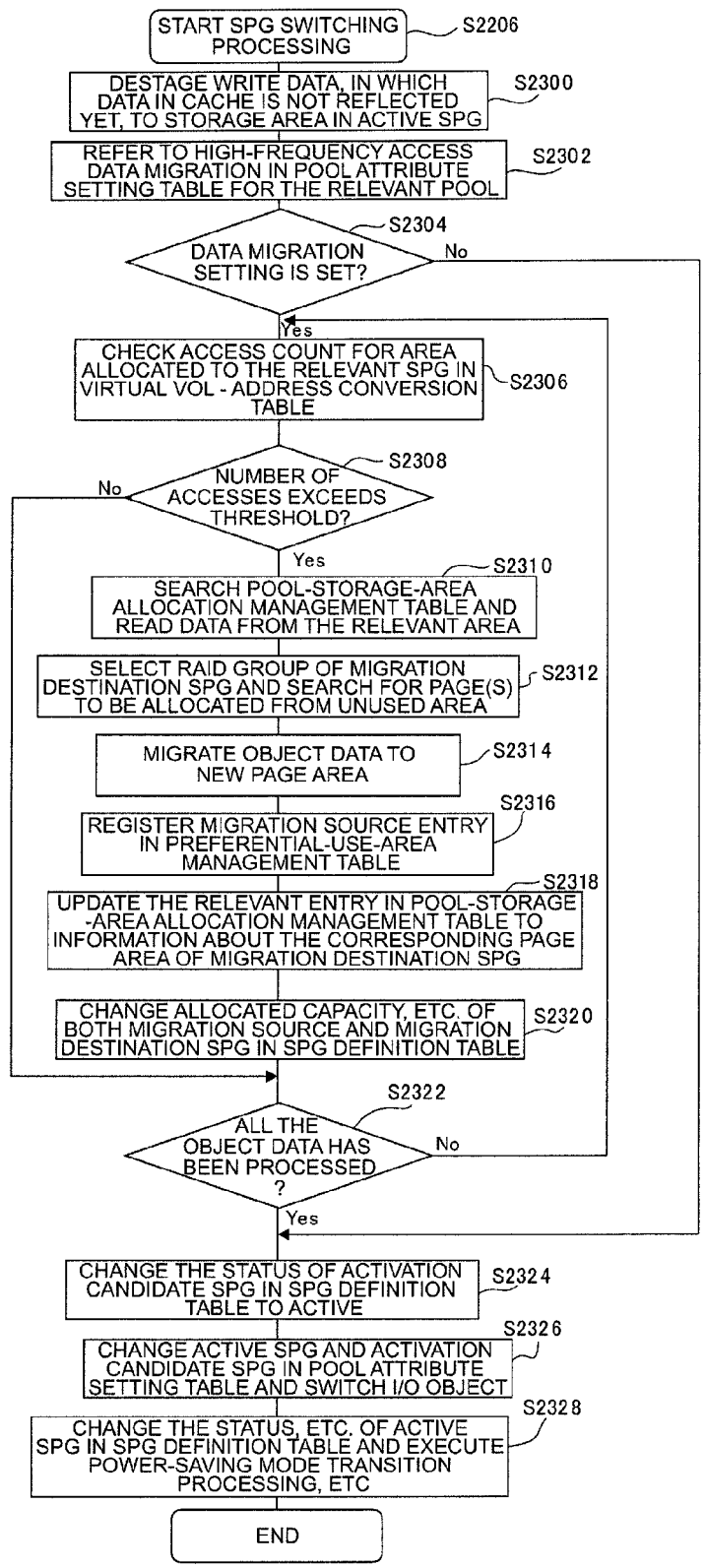
FIG. 23 is a flowchart illustrating a subroutine of the overall flowchart (FIG. 22) of the active sub-pool group switching processing.

Next, power-saving processing by the storage apparatus 30 will be explained. The power-saving management includes a flowchart illustrating active SPG switching check processing as shown in FIG. 22 and a flowchart illustrating active SPG switching processing as shown in FIG. 23. These flowcharts are executed by the controller 31 which executes the MAID execution program 3506.

The active SPG switching processing will be explained with reference to FIG. 22. This processing checks whether or not the active SPG switching processing is necessary for a pool constituting storage areas for the storage apparatus 30; and the processing is started as triggered by polling at regular time intervals by means of a timer or the occurrence of allocation of a new page(s) to data.

The controller 31 checks the pool attribute setting table 3508 (FIG. 9) and checks the MAID attribute and the power-saving policy for each pool (S2200).

If the controller 31 confirms in S2202 that "Completely Inhibited" is set as the MAID attribute to the check object pool, it determines that it is unnecessary to switch the SPG; and then terminates the flowchart (S2202: No).

On the other hand, if the controller 31 confirms that "Partially Permitted" or "Completely Permitted" is set as the MAID attribute to the check object pool, it refers to the SPG definition table 3512 (FIG. 13) with respect to eh active SPG and judges whether or not a check item(s) which is the operating time and/or the increased capacity with respect to the active SPG exceeds the threshold(s) (S2204).

If an affirmative judgment is returned in the above step, the controller 31 executes the SPG switching processing shown in FIG. 23 (S2206). If a negative judgment is returned in this step, the controller 31 judges whether or not the check item is close to the threshold (S2208). If a negative judgment is returned, the controller 31 recognizes that it is unnecessary to switch the active SPG; and then terminates this processing.

On the other hand, if a negative judgment is returned in the above step, the controller 31 changes the status of an SPG, which is an activation candidate, to the state of being activated or being diagnosed (S2210) and then activates the activation candidate (next candidate) SPG (S2212).

Next, the active SPG switching processing will be explained with reference to the flowchart in FIG. 23. The controller 31 runs the MAID execution program 3506 and executes the active SPG switching processing. The controller 31 starts the flowchart in FIG. 23 as triggered by the activation check by the activation check flowchart in FIG. 22.

The controller 31 checks a dirty flag in the cache memory 32; and if dirty data exists, the controller 31 destages the dirty data to an object area in the active SPG (S2300).

The controller 31 refers to the pool attribute setting table 3508 (FIG. 9) for the pool, to which the switching processing object SPG belongs, during the active SPG switching processing, refers to the power-saving policy definition table 3514 (FIG. 14) based on power-saving policy information (S2302), and checks if the high-frequency access data migration setting is set or not (S2304).

If this setting is not set (S2304: No), the controller 31 does not migrate data, but executes the active SPG switching processing. Specifically speaking, the controller 31 changes the status of the next candidate SPG to active (S2324) in the SPG definition table 3512 (FIG. 13). Incidentally, if the activation candidate state, which is defined by the power-saving policy, is set to the pool attribute, the controller 31 executes processing for having the SPG which is the next candidate make the transition to the set mode.

Next, the controller 31 changes the active SPG to the next candidate SPG in the pool attribute setting table 3508 and switches the I/O object to the RAID group of this SPG (S2326). Furthermore, in the SPG definition table 3512 (FIG. 13), the controller 31 changes the status of the pre-switched SPG from the active mode to the power-saving mode and changes the status of the post-switched SPG from the power-saving state mode to the active mode, thereby changing the state of the relevant SPG as described above (S2328).

On the other hand, if the controller 31 determines that the data migration setting is set (S2304: Yes), it checks the access account in the virtual volume—address conversion table 362 (FIG. 15) with respect to data existing in an area of the object SPG for the switching processing (S2306); and then judges whether the access count exceeds the threshold or not (S2308).

If a negative judgment is returned in this step, the controller 31 judges whether or not processing for determining the necessity of data migration has been executed on all the areas of the object SPG for the switching processing in the virtual volume—address conversion table 362 (FIG. 15) (S2322).

If a negative judgment is returned in this step, the controller 31 checks the access account for the next area in the pre-switched SPG (S2306).

If the controller 31 determines that the number of accesses exceeds the threshold, it searches the pool-storage-area allocation management table 3516 (FIG. 16) from the entry of the processing object page and reads data from the relevant area (S2310) and selects a RAID group from the data migration destination SPG and searches for a page(s) to be allocated from the unused area (S2312).

The data migration destination SPG may be any of an SPG belonging to the same pool, an SPG belonging to anther pool, or an SPG belonging to another tier. This SPG may be either a MAID non-object SPG or a MAID object active SPG. There may be a plurality of data migration destination SPGs. Data migration may be executed when the status of the data migration destination SPG is in any of the following states: the state of being activated, the state of being diagnosed, or after activation (active). The controller 31 selects the data migration destination SPG according to the power-saving policy definition table 3514 and the pool attribute setting table 3508 or the tier attribute definition table 3510. If a preferential use area exists in the data migration destination SPG, the controller 31 prioritizes this area in migrating data.

The controller 31 migrates object data with high access frequency to a new searched page(s) (S2314).

Next, the controller 31 registers entry information about the data migration source SPG in the preferential-use-area management table 3518 (FIG. 19) for the pool to which the migration source SPG belongs (S2316).

Furthermore, the controller 31 updates the migration source entry in the pool-storage-area allocation management table 3516 (FIG. 16) to area information about the data-allocated page(s) of the migration destination SPG (S2318). The controller 31 further changes each allocated capacity, etc. of the migration source SPG and the migration destination SPG in the SPG definition table 3512 (FIG. 13) as described below (S2320). Also, if the threshold is set to the migration destination SPG, the controller 31 also changes the increased capacity.

Migration Source SPG: allocated capacity aa−n
increased allocated capacity xx−n
Migration Destination SPG: allocated capacity bb+n
increased allocated capacity yy+n
(n: migrated data capacity)

Subsequently, the controller 31 makes a judgment in S2322. If the controller 31 judge in the negative in this step, the controller 31 executes S2306. If the controller 31 judge in the affirmative in S2322, the controller 31 changes the status of the activation candidate SPG in the SPG definition table 3512 to active (S2324).

Next, the controller 31 changes the active SPG and the activation candidate SPG in the pool attribute setting table 3508 (FIG. 9) and changes the SPG, which has newly entered the active mode, to the I/O access in possible (S2326).

Furthermore, the controller 31 changes the status of the active SPG in the SPG definition table 3512 (FIG. 13), executes the power-saving processing on the SPG, which should make the transition to the power-saving mode, and changes the status of the SPG, which has made the transition to the power-saving mode, to the relevant form of the power-saving mode (S2328).

The case where the external storage device 600 is connected to the storage apparatus 30 was described with reference to FIG. 3. Connecting different types of storage devices causes the following problem. For example, a transfer speed of Tier-3 drive(s) (transfer speed: 3 Gbps (Giga bits per second)) shown in FIG. 12 is lower than a transfer speed of higher tier drive(s) (transfer speed: 6 Gbps).

For example, there is no problem with mounting 3-Gbps drives in a 6-Gbps back-end SAS drive chassis. However, if a low-version old type apparatus (3-Gbps SAS drive) is externally connected to a new 6-Gbps back-end SAS drive type apparatus, a transmission speed between ports and an external cable for connecting the new type apparatus and the old type apparatus may become a bottleneck.

According to 6 Gbps SAS-2 standards, communication can be performed by multiplexing two low-speed logical links (3 Gbps*2) on one high-speed physical link (6 Gbps). The new type apparatus of a high transfer speed and the old type apparatus of a low transfer speed can be connected via an external connection cable. This one external cable can be normally connected to four physical links. If this cable is connected to 4× wide links, there is a possibility that the above connection may be recognized only as one path by an SAS expander according to the old defacto standards in the old type apparatus, so that multiplex transfer cannot be performed.

Therefore, the problem is that multiple transmission of write data from a controller 31 for the new type apparatus to a plurality of drives in the old type apparatus cannot be performed.

Figure 24:
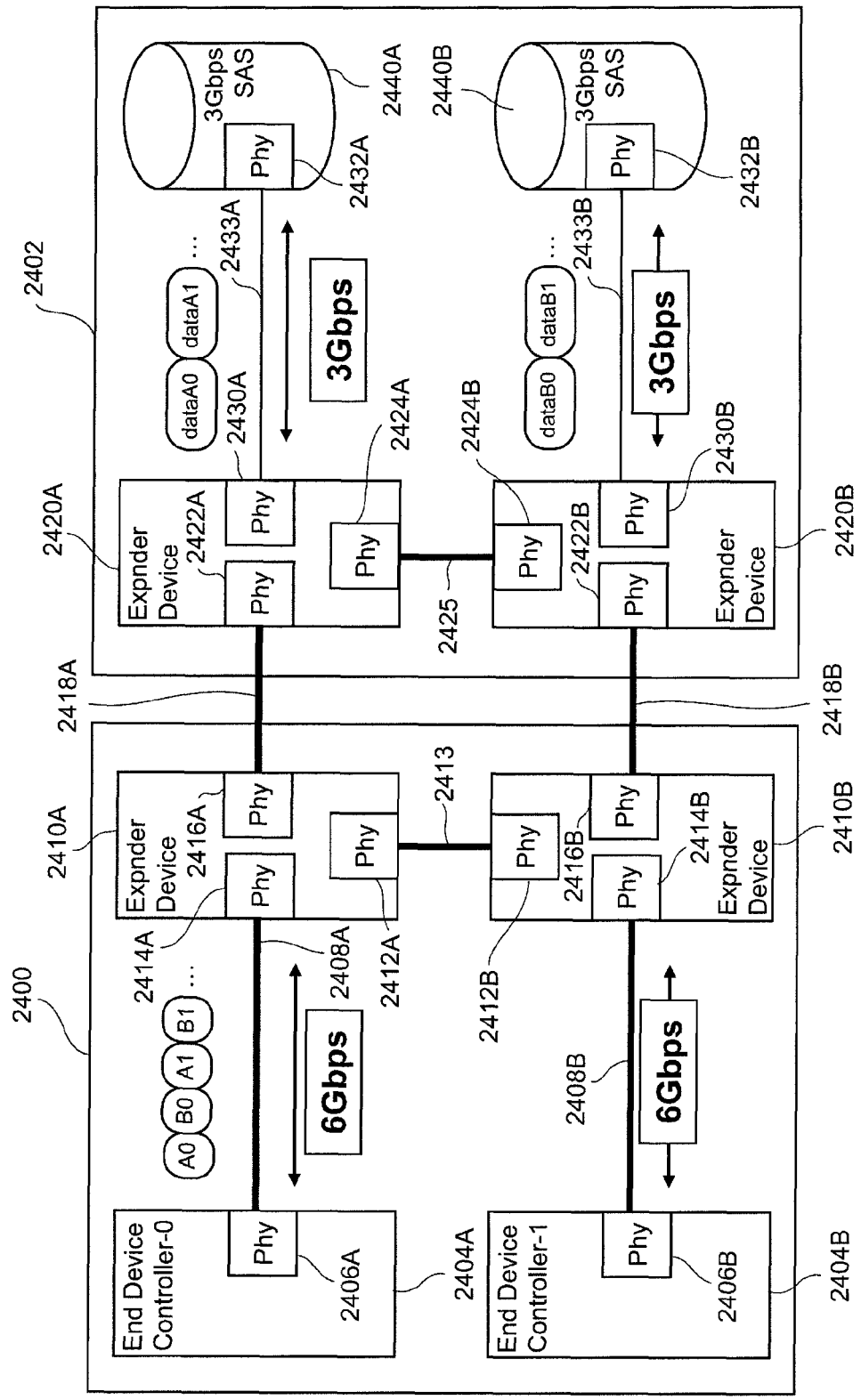
FIG. 24 is a block diagram showing a hardware configuration in which an old type apparatus is connected to a new type apparatus.

A first embodiment (FIG. 24) for solving the above-described problem is intended to realize an execution transfer speed of 6 Gbps by providing dual ports, which are connected for redundancy, on each of a new type apparatus 2400 and an old type apparatus 2402.

The new type apparatus 2400 includes a controller 0 (2404A) and a controller 1 (2404B) as end devices (controllers), and expanded devices (interfaces) 2410A, 2410B. An internal link 2408A with a transfer speed of 6 Gbps exists between a port 2406A of the controller 2404A and a port 2414A of the interface 2410A.

Also, an internal link 2408B with a transfer speed of 6 Gbps exists between a port 2406B of the controller 2404B and a port 2414B of the interface 2410B.

A port 2412A of the interface 2410A and a port 2412B of the interface 2410B are connected via preferably a 6-Gbps internal link 2413.

A port 2416A of the interface 2410A is connected to an external cable 2418A (4 wide, 3 Gbps) and a port 2416B of the interface 2410B is connected to an external cable 2418B (4 wide, 3 Gbps).

The old type apparatus 2402 has expanded devices (interfaces) 2420A, 2420B and SAS drives (3 Gbps) 2440A, 2440B. A port 2422A of the interface 2420A is connected to the external cable 2418A and a port 2430A is connected to a port 2432A of the SAS drive 2440A via an internal link (3 Gbps) 2433A.

A port 2422B of the interface 2420B is connected to the external cable 2418B and a port 2430B is connected to a port 2432B of the SAS drive 2440B via an internal link (3 Gbps) 2433B. A port 2424A of the interface 2420A is connected to a port 2424B of the interface 2420B via an internal link (3 Gbps) 2425.

If multiple transmission of 6-Gbps data (A0, B0, A1, B1, and so on: "An: n is integer" is write data to the SAS drive 2440A and "Bn: n is integer" is write data to the SAS drive 2440B) is executed between the controller 2404A and the interface 2410A within the new type apparatus 2400 according to the embodiment shown in FIG. 24, the interface 2410A divides the multiplexed data into data for the SAS drive 2440A and data for the SAS drive 2440B, sends the data for the SAS drive 2440A from its port 2416A to the external cable 2418A, and sends the data for the SAS drive 2440B via the port 2412A and the internal link 2413 to another interface 2410B; and then the interface 2410B sends the data for the SAS drive 2440B from the port 2416B to the external cable 2418B. Therefore, even if the transmission speed of the external cable is 3 Gbps, the new type apparatus 2400 can maintain 6-Gbps multiple transmission.

However, the path 2413 is limited to 3 Gbps by this method and another path is recognized by discovery of the HDDs, so that the number of devices that can be connected may possibly decrease by half.

Figure 25:
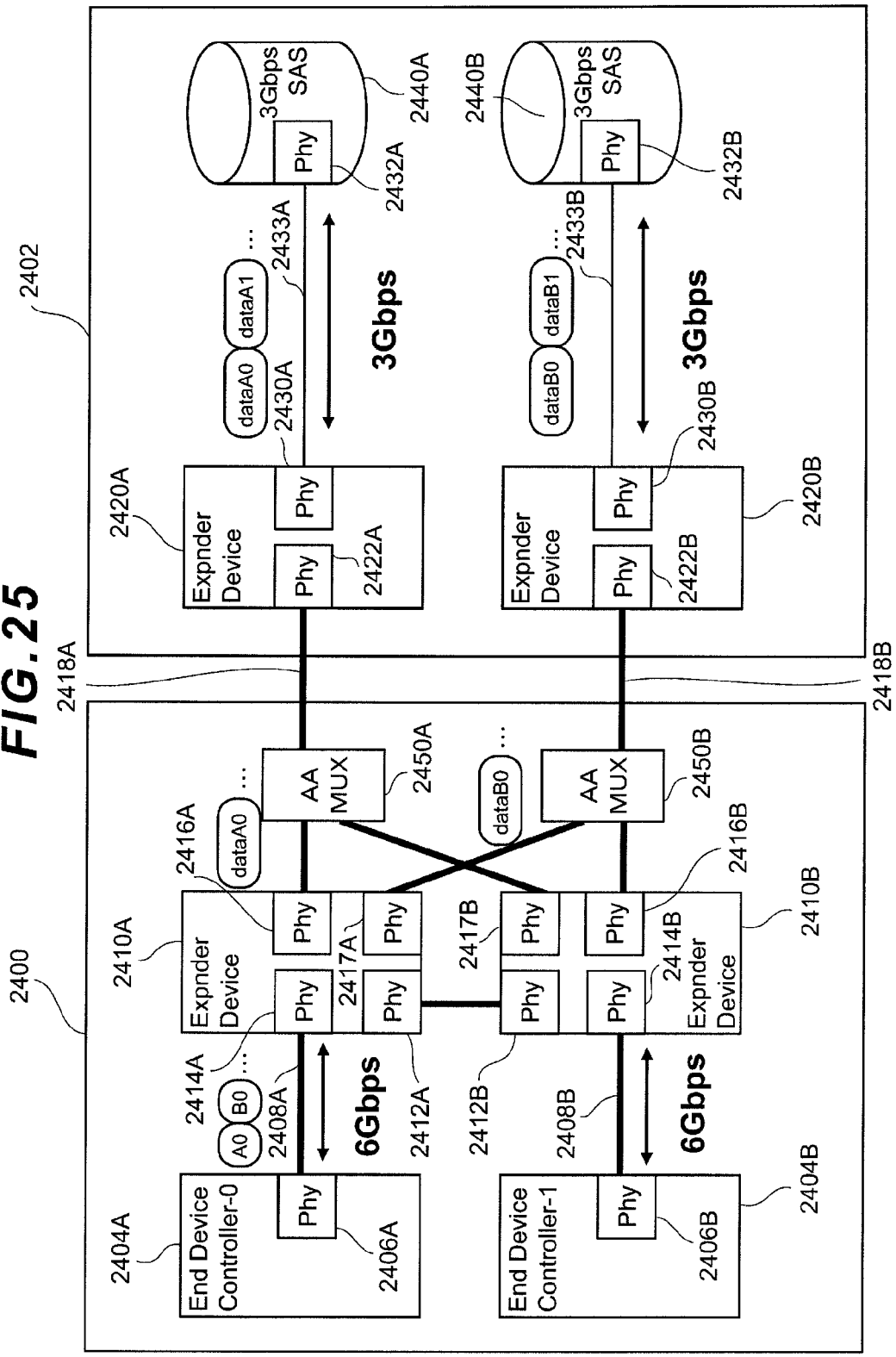
FIG. 25 is a first block diagram in which the hardware configuration shown in FIG. 24 is changed.

In a second embodiment (FIG. 25), multiplexers (AA-MUX) 2450A, 2405B are provided in the new type apparatus 2400, the port 2416A of the interface 2410A is connected to the multiplexer 2450A and the port 2416B of the interface 2410B is connected to the multiplexer 2450B.

The multiplexer 2450A is connected to the external cable 2418A and the multiplexer 2450B is connected to the external cable 2418B. A port 2417A of the interface 2410A is connected to the multiplexer 2450B and a port 2417B of the interface 2410B is connected to the multiplexer 2450A. The aforementioned problem can be solved by placing dual multiplexes, which operate at 6 Gbps during 6-Gbps transfer, in the new type apparatus 2400.

Figure 26:
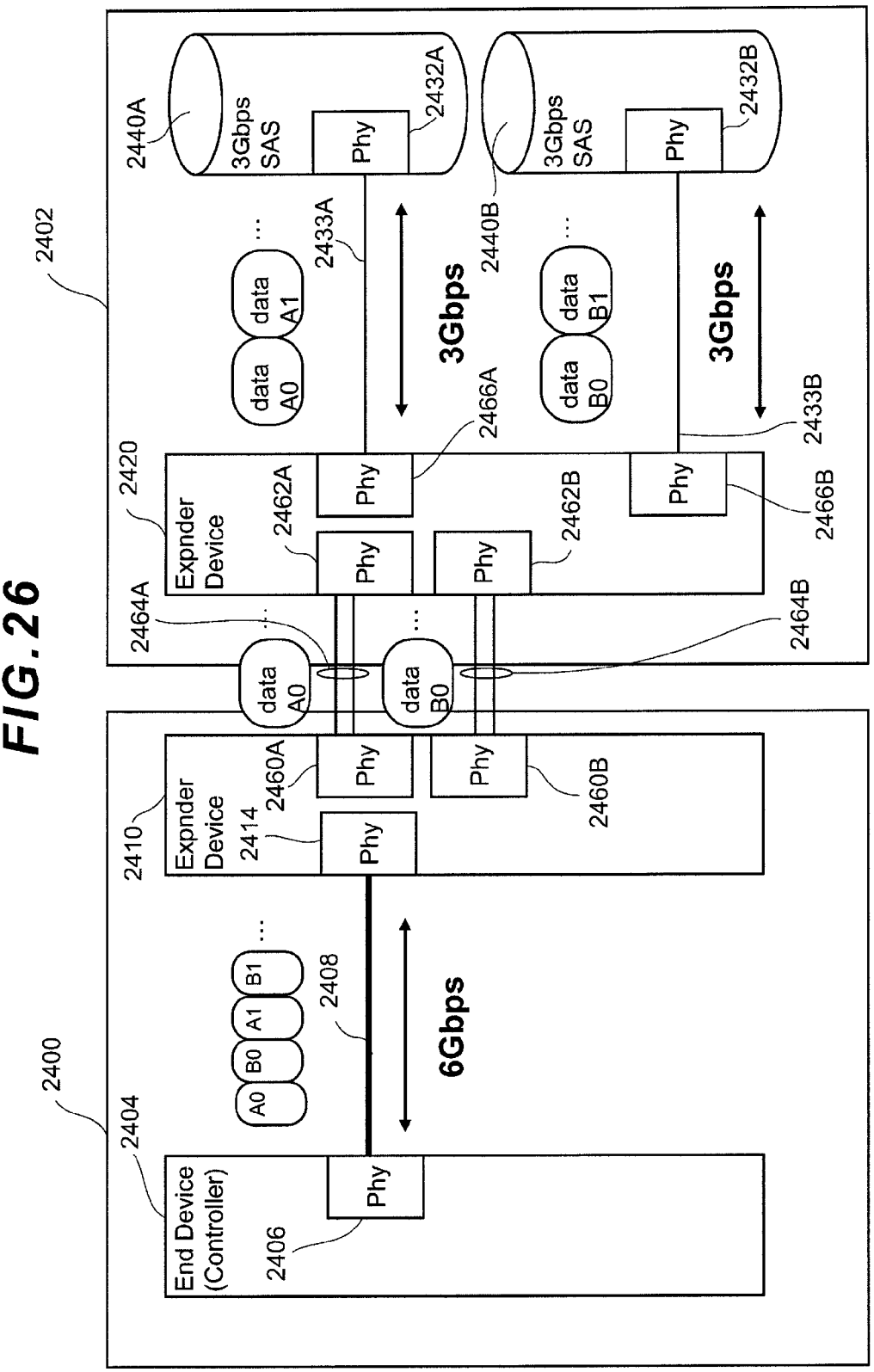
FIG. 26 is a second block diagram in which the hardware configuration shown in FIG. 24 is changed.

A third embodiment (FIG. 26) is configured so that the controller 2404 and its port 2406 in the new type apparatus 2400 are connected to a port 2414 of an interface 2410 via a 6 Gbps internal link 2408. It is intended to solve the aforementioned problem by settin the interface 2410 to wide links (two 2× wide links), each having two ports (2460A, 2460B); placing an interface 2420 for the old type apparatus 2402, which has two ports (2462A, 2462B) on the front-end side and two ports (2466A, 2466B) on the back-end side; sending data to the SAS drive 2440A by using a 2-wide, 3-Gbps external cable as an external cable 2464A between the port 2460A of the interface 2410 and the port 2462A of the interface 2420; similarly sending data to the SAS drive 2440B by using a 2-wide, 3-Gbps external cable as an external cable 2464B between the port 2460B of the interface 2410 and the port 2462B of the interface 2420; connecting the port 2462A of the interface 2420 to the port 2432A of the SAS drive 2440A via the internal link 2433A; and connecting the port 2462B of the interface 2420 to the port 2432B of the SAS drive 2440B via the internal link 2433B.

Figure 27:
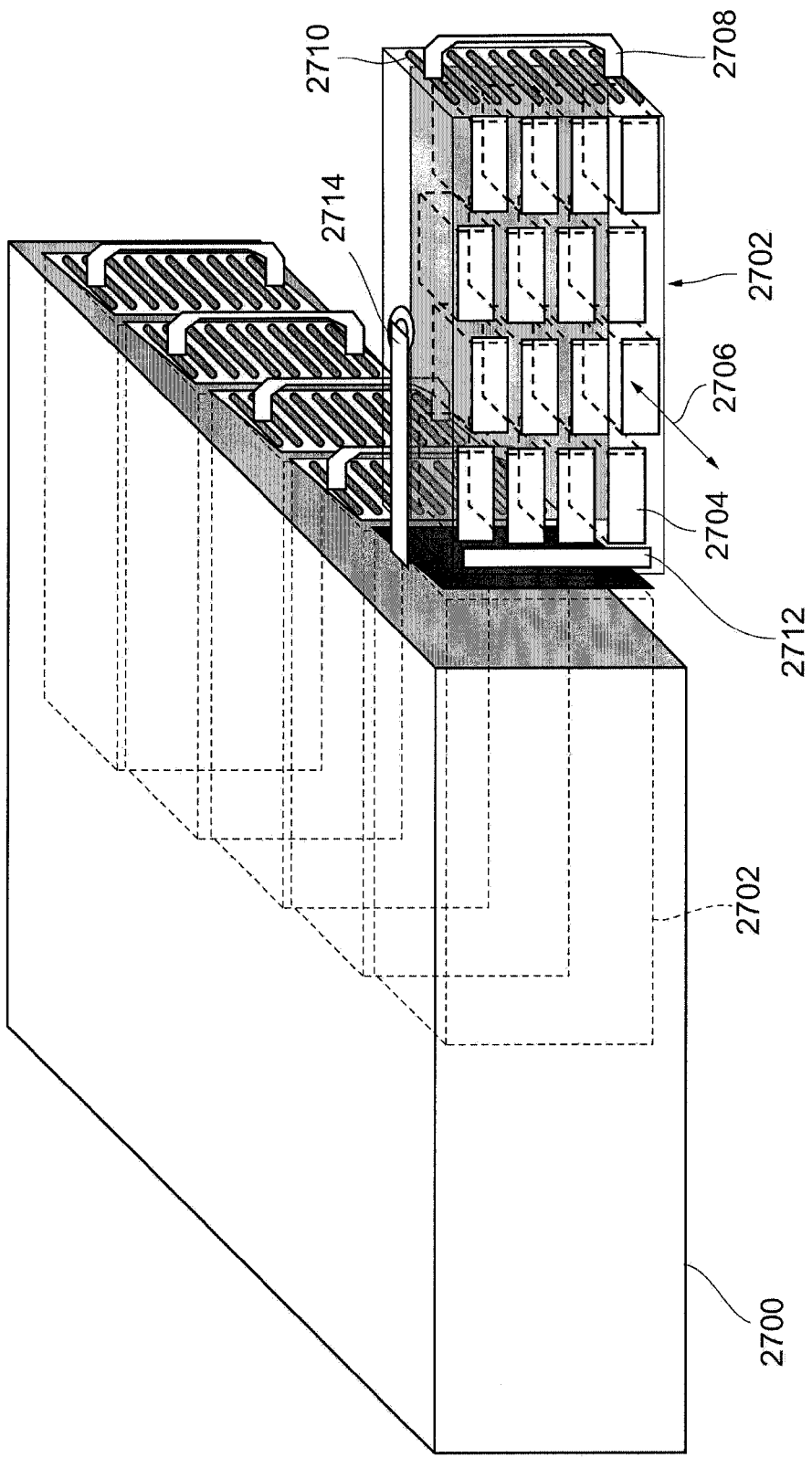
FIG. 27 is a perspective view of a configuration in which a plurality of HDDs for the storage apparatus (30) is placed.

Next, the configuration of the storage apparatus 30 to accommodate a plurality of HDDs will be explained with reference to FIG. 27. A plurality of HDD mounting units 2702 into which a plurality of HDD units 2704 are inserted are placed in a chassis 2700 of this housing.

One or more HDD mounting units 2702 constitute a pool. An SPG is constituted from one or more HDD mounting units 2702 or a plurality of HDD units 2704 within one HDD mounting unit 2702. Alternatively, an SPG may be constituted from a plurality of different HDD mounting units 2702.

The HDD units 2704 are supported by an HDD mounting unit 2702 so that they can be inserted into, or pulled out of, the HDD mounting unit 2702 in a direction perpendicular 2706 to the lengthwise direction of the HDD mounting unit 2702. A handle 2708 is provided on the front face of the housing for the HDD units 2704 so that a maintenance engineer can move the HDD units 2704 back and forth relative to the chassis 2700. Furthermore, air intake(s) 2710 exist on the front surface of the HDD mounting unit 2702, and fan unit(s) 2712 for cooling the HDDs exists close to the back face of the HDD mounting unit 2702. Furthermore, guide frames 2714 for moving the HDD mounting unit 2702 back and forth relative to the chassis 2700 are provided on the top and bottom faces of the HDD mounting unit 2702.

Figure 28A:
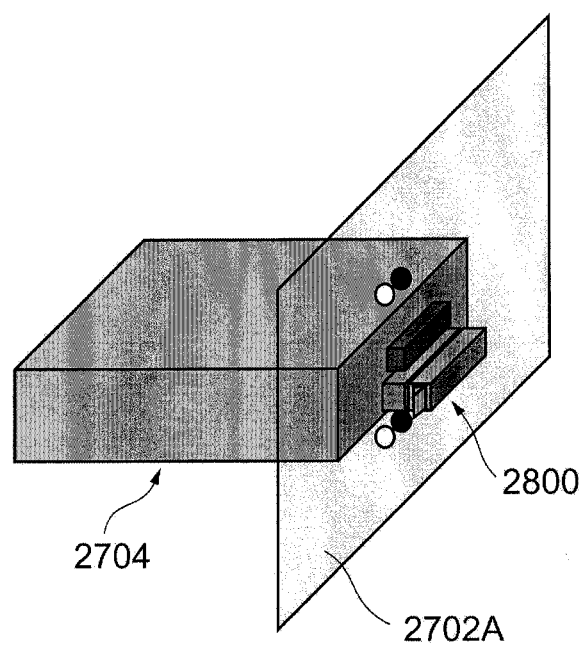
FIG. 28A is a perspective view of a configuration supporting an HDD mounting unit at a chassis as seen from a view point at the back of the chassis.
Figure 28B:
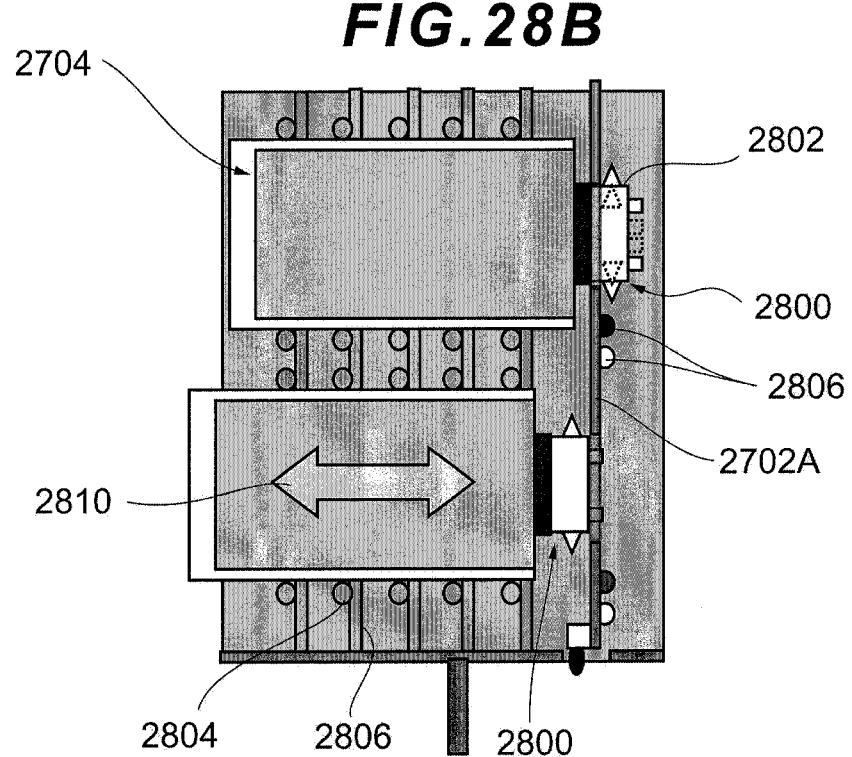
FIG. 28B is a plan view of HDD mounting units as seen from a planar view point.

FIG. 28A and FIG. 28B illustrate a configuration to attach the HDD units 2704 to a backboard 2702A of the HDD mounting unit 2702 and support the HDD units 2704 on the backboard 2702A. FIG. 28A is a perspective view of the HDD mounting unit 2702 as seen from its back, and FIG. 28B is a plan view of the HDD mounting unit as seen from above.

The HDD unit 2704 is fixed to, and hermetically sealed by, the backboard 2702A of the HDD mounting unit 2702 with a latch 2800 as shown in FIG. 28A. It is hermetically sealed in order to secure a flow rate of cooling air. The maintenance engineer goes behind the back face of the chassis and releases the latch 2800 as shown with a dotted line in FIG. 28B so that they can pull the object HDD unit 2704 out of the chassis in a direction indicated with an arrow 2810.

A reference numeral 2802 represents an unlatching lever. Furthermore, LEDs 2806 for displaying any fault of each HDD unit are provided on the back face of the chassis. The maintenance engineer checks the LEDs from behind the chassis.

The HDD units 2704 are supported by rigid wire frames 2804, 2806, which extend from right to left and up and down within the chassis and intersect with each other, and needle bearings as shown in FIG. 28B in order to avoid windage loss caused by cooling air.

Figure 29:
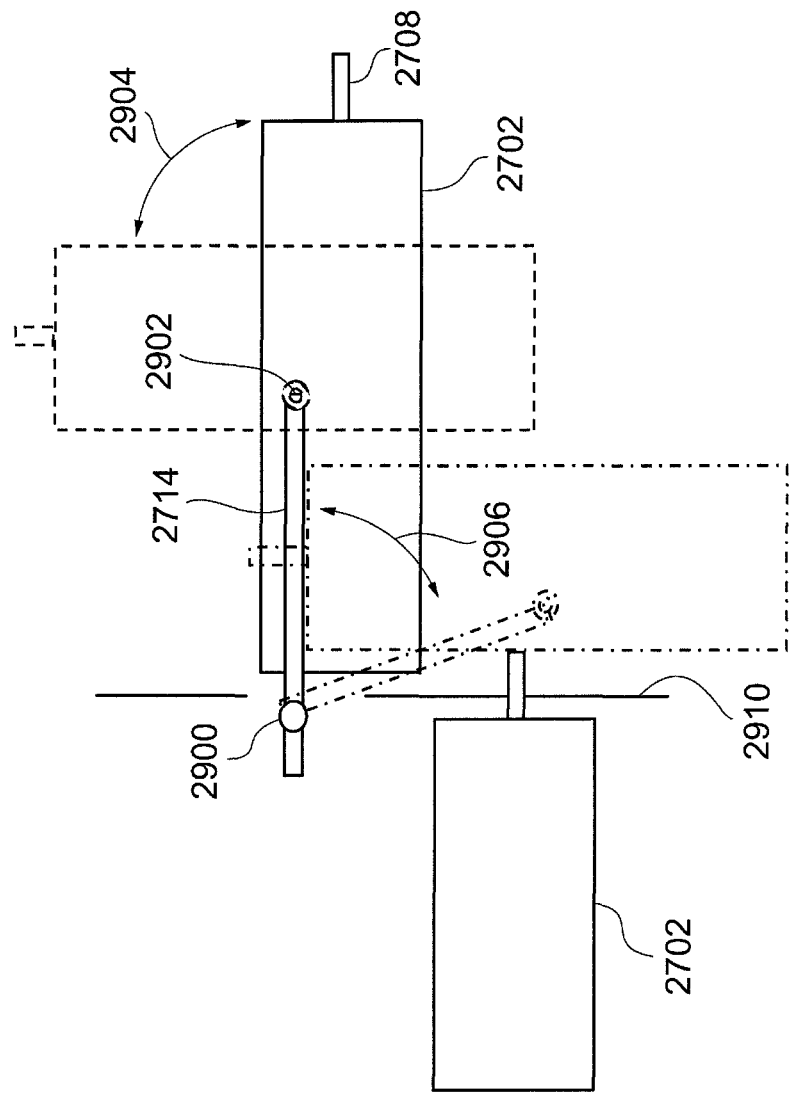
FIG. 29 is a plan view of a configuration to insert an HDD mounting unit 2702 into the chassis, pull it out of the chassis, and rotate it relative to the chassis.

FIG. 29 is a plan view of a configuration to pull and move the HDD mounting unit 2702 back and forth and rotate it relative to the chassis 2700. The guide frames 2714 are intended to guide a movable mechanism for moving the HDD mounting unit 2702 relative the chassis and support the HDD mounting unit 2702; are positioned on the top and bottom surfaces of the HDD mounting unit 2702; and protrudes from the front face 2910 of the chassis 2700 as the HDD mounting unit is pulled out.

A first support member 2902 is provided at a top end of the guide frame 2714, and the first support member supports the HDD mounting unit 2702 at a position offset from the center of the planar surface of the HDD unit so that the HDD mounting unit 2702 can free rotate as shown with an arrow 2904.

A second support member 2900 is provided at a base end of the guide frame 2714 and this second support member 2900 supports the guide frame 2714 so that the guide frame 2714 can freely rotate relative to the chassis as shown with an arrow 2906.

After the HDD mounting unit 2702 is pulled out of the chassis, the HDD mounting unit 2702 is made to rotate on the first support member 2902 and the guide frame 2714 is then made to rotate on the second support member 2900, if necessary, so that an HDD insertion/pull-out face of the HDD mounting unit 2702 will face front and be positioned opposite the maintenance engineer, thereby making it easier for the maintenance engineer to do work for maintenance and replacement of the HDD(s).

Figure 30:
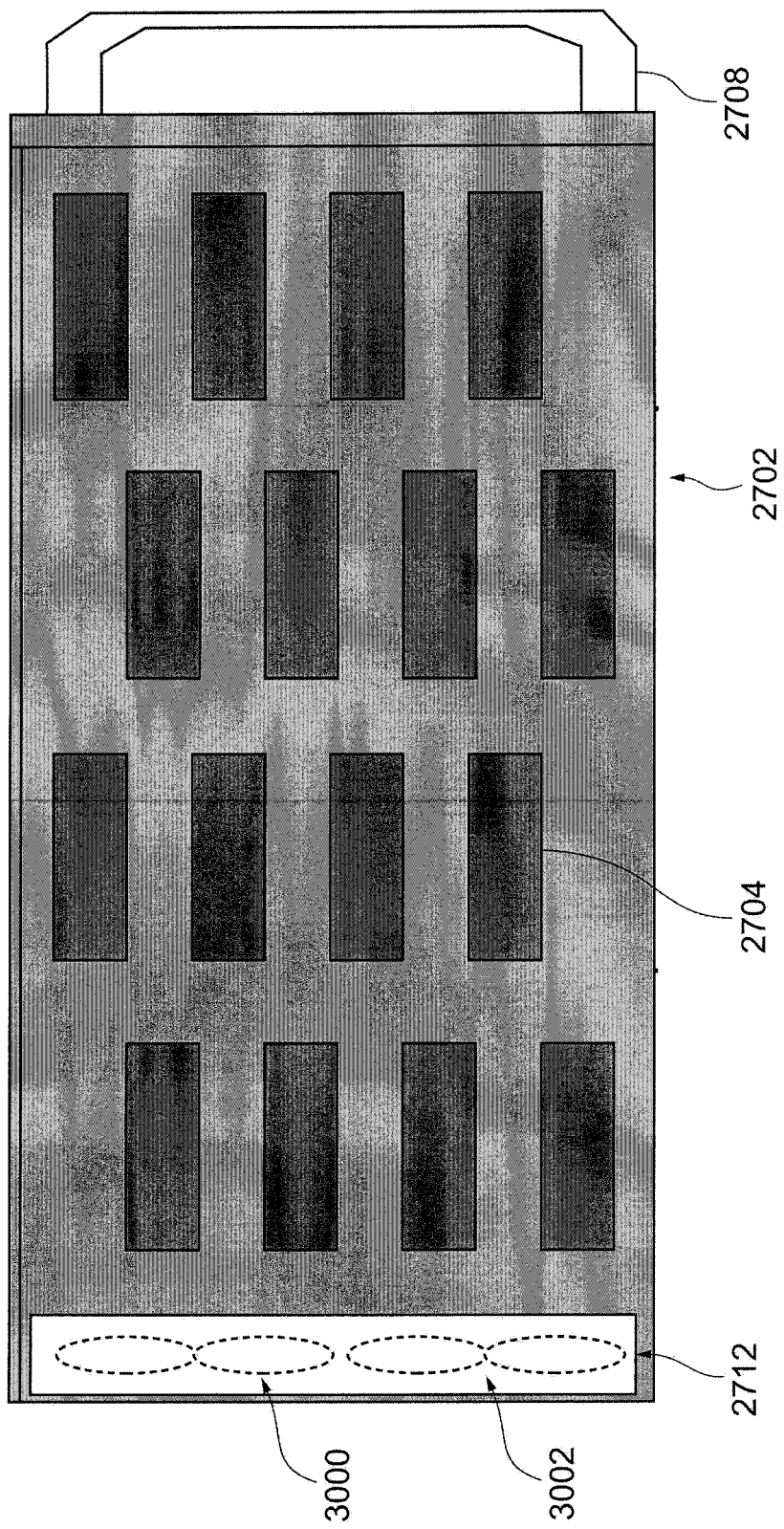
FIG. 30 is a side view of the HDD mounting unit equipped with fans on its rear side.

As shown in FIG. 30, the fan unit 2712 on the left side of the HDD mounting unit 2702 has two fans 3000, 3002. The HDD mounting unit 2702 has a drive circuit for the fans and the storage apparatus 30 controls driving the fans according to the power-saving policy definition table 3514 (FIG. 14) described earlier as part of the MAID control.

For example, if HDDs are not mounted on the HDD mounting unit 2702, a large amount of air flows into the chassis of the storage apparatus 30 due to low air intake resistance and there is a possibility that cooling air exhaust efficiency of other HDD mounting units 2702 equipped with HDDs may decrease. Therefore, the fans may be made to rotate at a slower speed.

As a result, it is possible to eliminate the necessity of using dummy canisters in a no HDD-mounted area and save the cost for the dummy canisters. The HDD mounting unit 2702 is configured so that a plurality of HDD units 2704 are arranged in staggered rows (in a zigzag pattern) as shown in FIG. 30 in order to ensure that each HDD will get the cooling air, thereby enhancing the HDD cooling effect.

Figure 31:
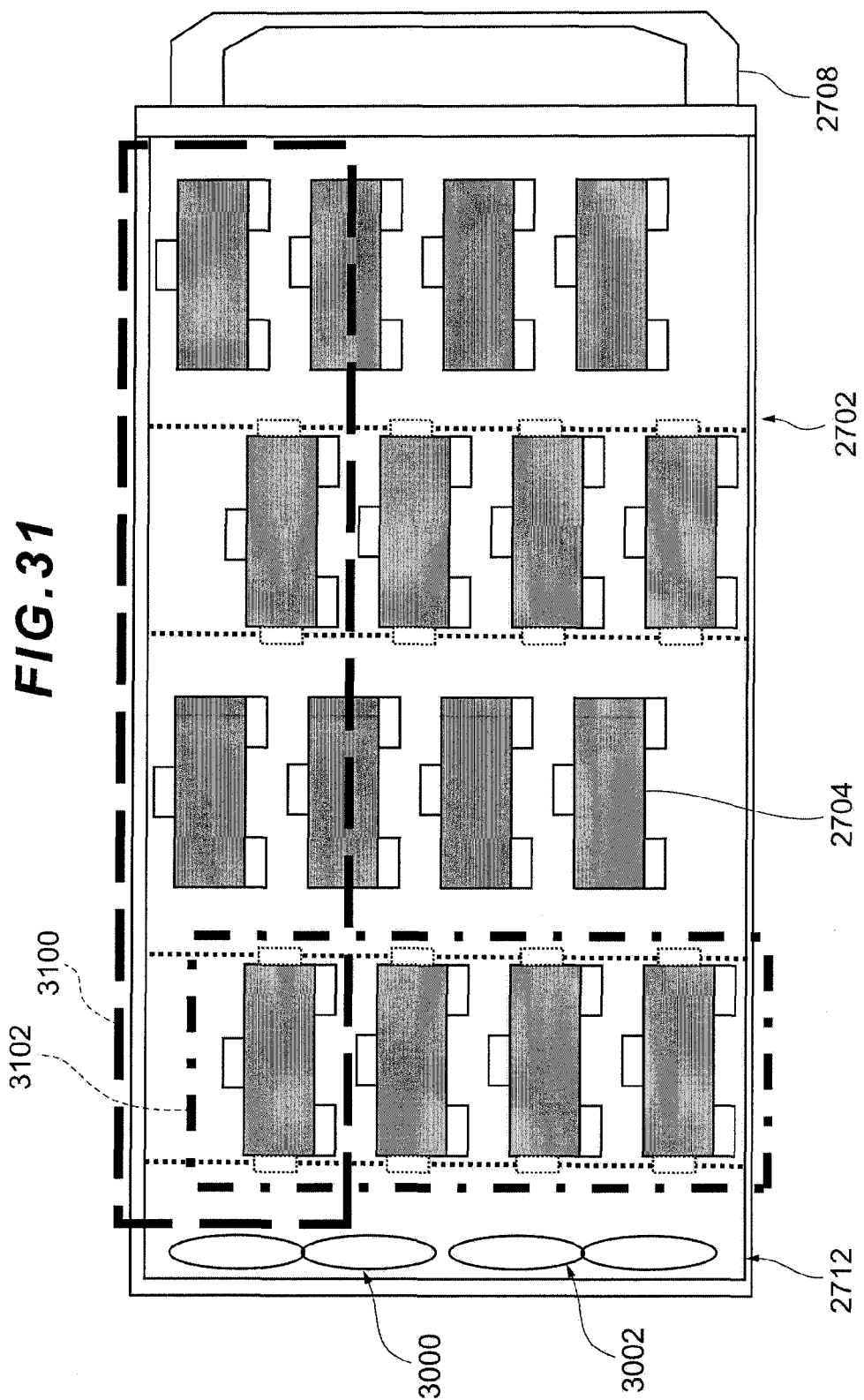
FIG. 31 is a side view of the HDD mounting unit for explaining an arrangement configuration of a plurality of HDDs.

The power-saving policy includes power-saving requirements for the fans such as stopping the rotation of the fans and slowing down the rotation of the fans as described above. For example, if an active SPG is formed in the lengthwise direction of the HDD mounting unit 2702 as shown in FIG. 31 (3100) and the MAID execution program 3506 (FIG. 8) makes this SPG enter the power-saving mode, the rotation of the first fan 3000 opposite this SPG is stopped or slowed down.

Figure 32:
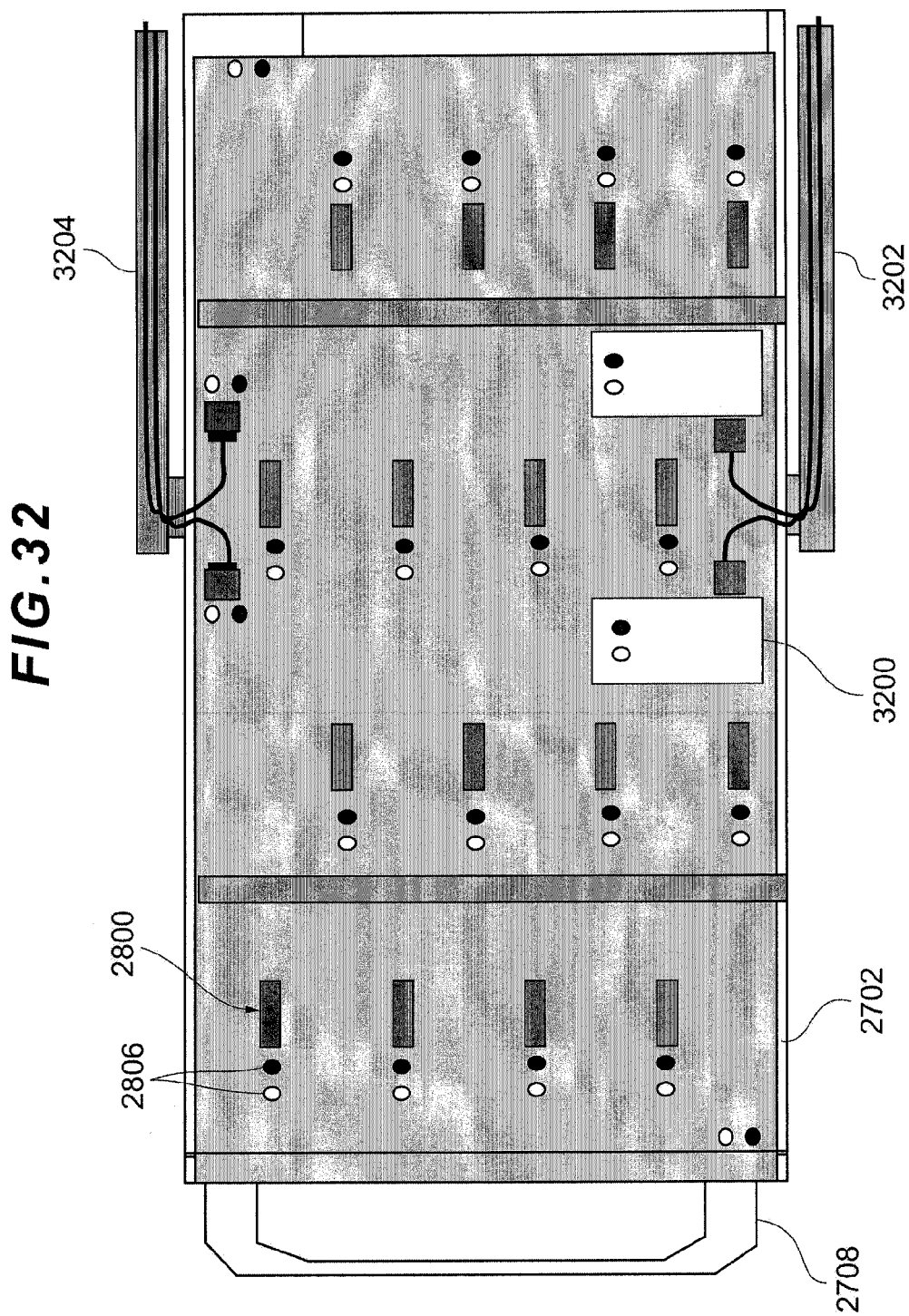
FIG. 32 is a side view of the backboard side of the HDD mounting unit for explaining a module configuration of the HDD mounting unit.

On the other hand, if an active SPG is formed in a direction perpendicular to the lengthwise direction (3102) and this SPG is made to enter the power-saving mode, the rotation of the two fans opposite the SPG is slowed down together. Incidentally, FIG. 32 is a view of the HDD mounting unit 2702 on its base plate side, and dual SES/expander modules 3200 that can be hot-plugged to the back face of the backboard 2702A are placed in order to mount as many HDDs as possible in consideration of maintainability. A reference numeral 3202 represents an I/F line. Also, dual power source lines 3204 are placed.

Next, a cooling configuration of power source units and HDD mounting units for the storage apparatus 30 will be explained. FIG. 33 is a plan view of the chassis 2700 for the storage apparatus 30 and two power source units 3300, 3302 exist on the rear face of the chassis 2700 and five HDD mounting units 2702 are arranged on the front face side of the chassis 2700 along the two power source units 3300,3302.

Each HDD mounting unit 2702 has its dedicated fan 3000 as described above. The power source unit 3300 has a fan 3303 on its back face and the power source unit 3302 has a fan 3305 in the same way.

The fans 3303, 3305 of the power source units 3300, 3302 and the fans 3000 of the HDD mounting units 2702 cause the outside air, which has been taken into the HDD mounting units 2702 through their front faces, to be discharged 3304 from the back faces of the power source units 3300, 3302.

The controller 31 for the storage apparatus 30 controls the drive circuit for the fans of the HDD mounting units 2702 and makes the fan of an HDD fan unit 27021 in the center rotate at a comparatively higher speed than other HDD mounting units, thereby preventing the air flow from lowering in the central area and also preventing deficient cooling in the central area.

A reference numeral 3308 represents a flow rate of exhaust air from the HDD mounting unit 27021 in the central area of the chassis 2700, and a reference numeral 3306 represents a flow rate of the exhaust air discharged from the HDD mounting units placed on the lateral sides of the chassis 2700. A reference numeral 3304 represents a flow rate of exhaust air from the two power source units 3300, 3302.

If a failure occurs in the fan of some HDD mounting unit 27022 from among a plurality of HDD mounting units 2702, the controller 31 for the storage apparatus 30 slows down or sequentially stops the rotation of the fans of the HDD mounting units other than the faulty HDD mounting unit 27022 as shown in FIG. 34, so that the fans 3303, 3305 of the power source units make the air flow equally through all the HDD mounting units including the HDD mounting unit with the faulty fan. If the rotational speed of the fans of the HDD mounting units other than the HDD mounting unit 27022 with the faulty fan is maintained after the occurrence of the failure, the amount of the outside air taken into the HDD mounting unit with the faulty fan will decrease.

Reference numerals 3306, 3308 represent flow rates of the outside air before reducing the rotational speed of the fans, and reference numerals 3306A, 3308A represent flow rates of the exhaust air after reducing the rotational speed of the fans. The controller 31 may make the fan of each of the power source units rotate at a high speed.

On the other hand, if a failure occurs in the fan 3303 of the power source unit 3300 as shown in FIG. 35, the controller 31 increases the rotational speed of the fans of an HDD mounting unit group 3504, which is placed on the side of the faulty power source unit 3300, to a higher level so that a flow rate 3502 of the exhaust air will increase more than a flow rate 3500 of the exhaust air from other HDD mounting unit group 3506.

REFERENCE SIGNS LIST

10 Host computer
20 Management apparatus
30 Storage apparatus
31 Controller
34 Storage devices (PDEVs)
60 Storage pool

The invention claimed is:

1. A storage apparatus comprising:
a virtual volume accessed by a host computer;
a storage pool having a storage resource associated with the virtual volume; and
a controller for controlling allocation of a storage area from the storage resource in response to write access from the host computer to the virtual volume,
wherein a plurality of storage devices that provide the storage pool with the storage resource constitute a plurality of first groups according to a RAID (Redundant Array of Independent/Inexpensive Disks) system and constitute a plurality of second groups including one or more first groups, and
wherein the controller:
sets some of the plurality of second groups to an active mode in which the storage devices belonging to the some groups are made to enter an activated state;
sets other groups, excluding a group which is set to the active mode from among the plurality of second groups, to a power-saving mode in which the storage devices belonging to those other groups are made to enter a power-saving state;
sequentially switches between the group, which is set to the active mode, and the group, which is set to the power-saving mode, from among the plurality of second groups; and
stores data by allocating a storage area from the storage resource for the second group in the active mode in response to write access by the host computer to the virtual volume,
wherein the storage pool has a first pool and a second pool,
wherein the first pool has a first storage resource constituted from a plurality of storage devices that are classified into a first tier,
wherein the second pool has a second storage resource constituted from a plurality of storage devices that are classified into a second tier,
wherein the plurality of storage devices classified into the first tier are classified into a plurality of groups, and
wherein the plurality of storage devices classified into the second tier are classified into a plurality of groups, and
wherein the controller further:
sets all the plurality of groups belonging to the first tier to be capable of switching to the active mode or the power-saving mode; and
sets some groups of the plurality of groups belonging to the second tier to be always in the active mode and sets the remaining groups to switch to the active mode or the power-saving mode.

2. The storage apparatus according to claim 1, wherein the controller further:
allocates the storage area to an access area of the virtual volume in response to the write access from the host computer to the virtual volume so that load will be imposed equally on the storage resource belonging to the second group in the active mode.

3. The storage apparatus according to claim 1, wherein the storage resource of the storage pool is provided from storage devices classified in a specified tier.

4. The storage apparatus according to claim 3, wherein there are a plurality of storage pools and each storage pool has a storage resource of storage devices classified into different tiers.

5. The storage apparatus according to claim 1, wherein the controller further:
sets a threshold;
compares an increase of an allocated amount of the storage area after the second group already in the active mode is set to active, with the threshold; and
changes the status of the next second group from the power-saving mode to the active mode and the status of the second group already in the active mode to the power-saving mode if the controller detects that the allocated amount has reached the threshold.

6. The storage apparatus according to claim 5, wherein the controller further:
switches the next second group to the second group already in the active mode after executing processing for diagnosing storage devices constituting a storage resource for the next second group.

7. The storage apparatus according to claim 1, wherein the controller further:
sets some groups from among the plurality of second groups as groups always in the active mode; and
sets a plurality of groups other than the some groups of the plurality of second groups as groups whose status is switched between the active mode and the power-saving mode.

8. The storage apparatus according to claim 1, wherein the controller further:
changes the number of groups to be set in the active mode at the same time, with respect to the plurality of second groups whose status is switched between the active mode and the power-saving mode, according to the state where they are accessed by the host computer.

9. The storage apparatus according to claim 1, wherein if it is determined that the pool is accessed by the host computer to write new data, the controller further:
allocates the storage area from the storage resource of the group in the active mode, from among the plurality of groups, to the logical volume.

10. The storage apparatus according to claim 9, wherein if it is determined that the pool is accessed by the host computer to write update data, the controller further:
specifies a group having a storage resource to which an object area of the access belongs;
detects a mode for the specified group; and
writes the update data to the storage resource of the group in the active mode if the detected mode is the power-saving mode.

11. The storage apparatus according to claim 10, wherein the controller further:
releases a storage area of the update data in the storage resource of the specified group from allocation to the logical volume; and
prioritizes allocation of the storage area over writing of new data to the storage resource of the specified group.

* * * * *